United States Patent [19]
Calinski et al.

[11] Patent Number: 6,089,191
[45] Date of Patent: Jul. 18, 2000

[54] MARINE HABITAT SYSTEMS

[75] Inventors: Michael D. Calinski, Naples, Fla.;
Bradley D. Gale, Rochester, N.Y.

[73] Assignee: Bruce Conley, Naples, Fla.

[21] Appl. No.: 08/937,635

[22] Filed: Sep. 25, 1997

Related U.S. Application Data

[60] Provisional application No. 60/045,581, May 5, 1997.

[51] Int. Cl.[7] .................................................. A01K 61/00
[52] U.S. Cl. ........................ 119/221; 119/208; 119/223; 119/238; 119/239
[58] Field of Search .................................... 119/208, 209, 119/221, 223, 238, 239, 240, 234, 235, 236, 237, 204, 205, 206

[56] References Cited

U.S. PATENT DOCUMENTS

| | | | |
|---|---|---|---|
| 249,942 | 11/1881 | Hughes | 119/239 |
| 413,503 | 10/1889 | Falero | 119/239 |
| 3,316,881 | 5/1967 | Fischer . | |
| 3,561,402 | 2/1971 | Ishida et al. . | |
| 3,601,095 | 8/1971 | Olsson | 119/206 |
| 3,741,159 | 6/1973 | Halaunbrenner . | |
| 3,766,888 | 10/1973 | Wiegardt | 119/240 |
| 3,824,957 | 7/1974 | Halaunbrenner | 119/238 |
| 3,858,554 | 1/1975 | Beaupoil et al. . | |
| 4,231,322 | 11/1980 | Gilpatric . | |
| 4,266,509 | 5/1981 | Gollott et al. . | |
| 4,328,764 | 5/1982 | Nickel . | |
| 4,377,987 | 3/1983 | Satre . | |
| 4,395,970 | 8/1983 | Kunkle et al. | 119/240 |
| 4,434,743 | 3/1984 | Nickel . | |
| 4,508,057 | 4/1985 | Suzuki . | |
| 4,669,419 | 6/1987 | Kato et al. | 119/221 |
| 4,930,444 | 6/1990 | Vasile | 119/223 |
| 4,982,697 | 1/1991 | Neff . | |
| 4,993,362 | 2/1991 | Jimbo . | |
| 5,007,377 | 4/1991 | Muench, Jr. . | |
| 5,009,189 | 4/1991 | Neff . | |
| 5,042,424 | 8/1991 | Hense . | |
| 5,113,792 | 5/1992 | Jones et al. . | |
| 5,309,672 | 5/1994 | Spencer et al. . | |
| 5,628,280 | 5/1997 | Ericcson | 119/239 |
| 5,769,027 | 6/1998 | Adams et al. | 119/238 |

FOREIGN PATENT DOCUMENTS

| | | | |
|---|---|---|---|
| 2478947 | 10/1981 | France | 119/238 |

OTHER PUBLICATIONS

Sketch of Applicants' earlier prototype marine habitat designs.

*Primary Examiner*—Michael J. Carone
*Assistant Examiner*—James S. Bergin
*Attorney, Agent, or Firm*—Laura Barrow

[57] ABSTRACT

A family of man-made marine habitat systems and methods are disclosed for placement in various waterways to restore the natural marine environments that have been previously destroyed by commercial development as well as mitigate the damage caused by future development of coastal waters. The inventive marine habitat systems include individual habitat units having different configurations, more specifically, different sizes and arrangements of vertical and horizontal members, which are strategically placed in a restorative area in a body of water to serve as shelter for a variety of aquatic animals, including but not limited to, fish and a variety of bio-fouling organisms, including but not limited to oysters, mussels, and sea squirts. Novel anti-chafe devices and anchoring systems for use with the inventive marine habitat systems are also disclosed.

17 Claims, 16 Drawing Sheets

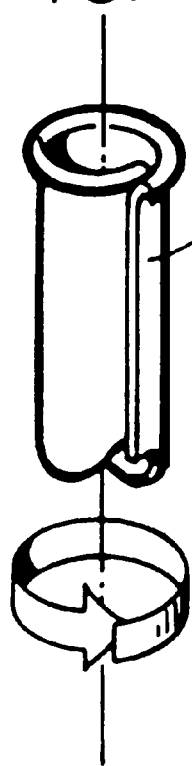
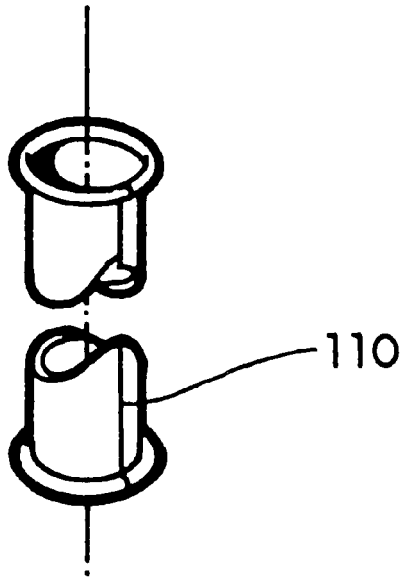
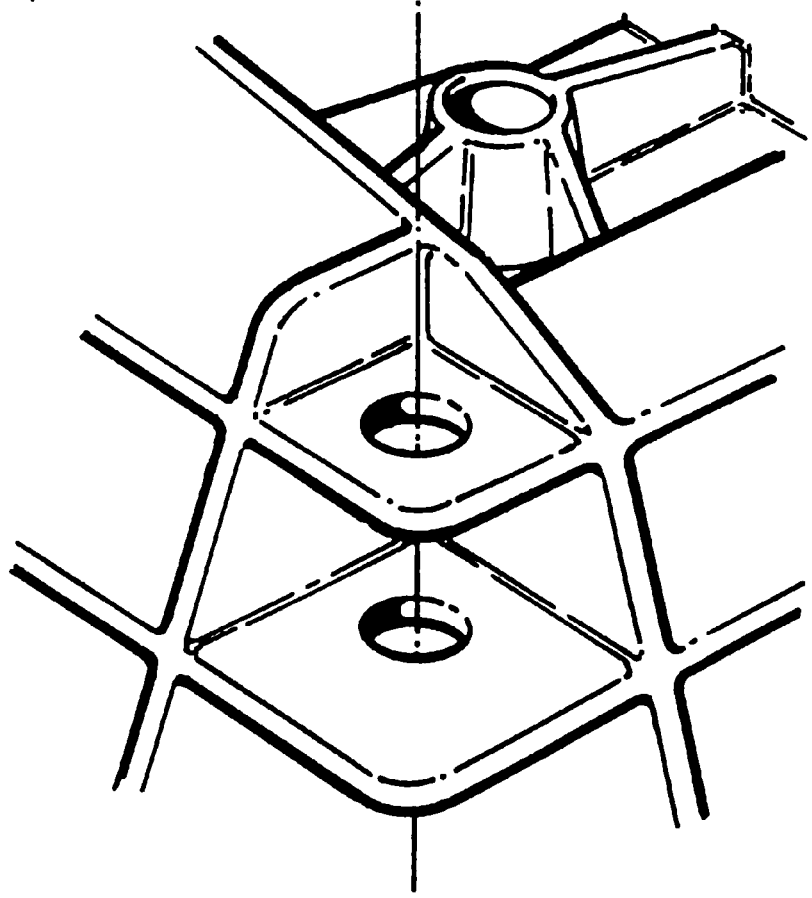

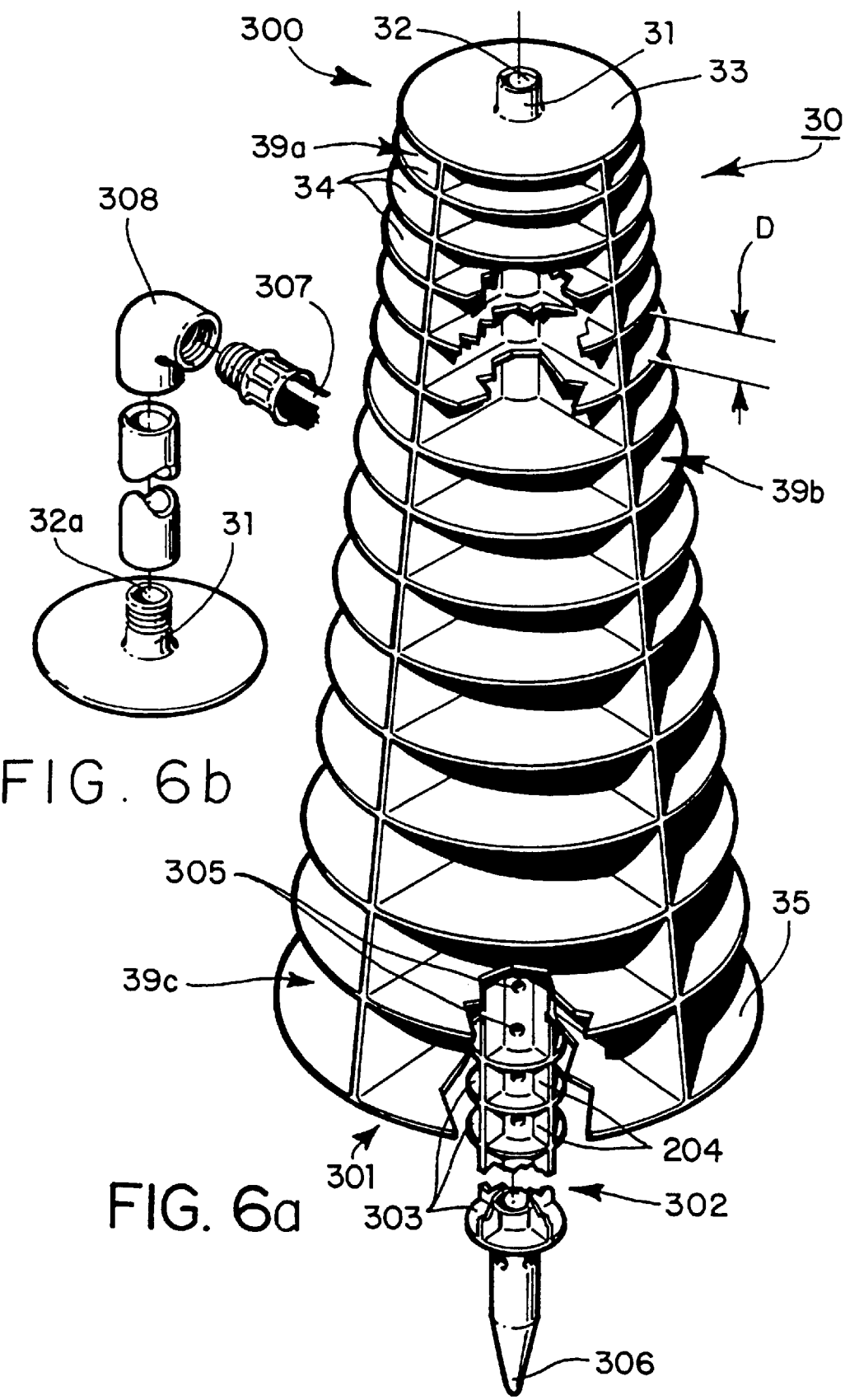

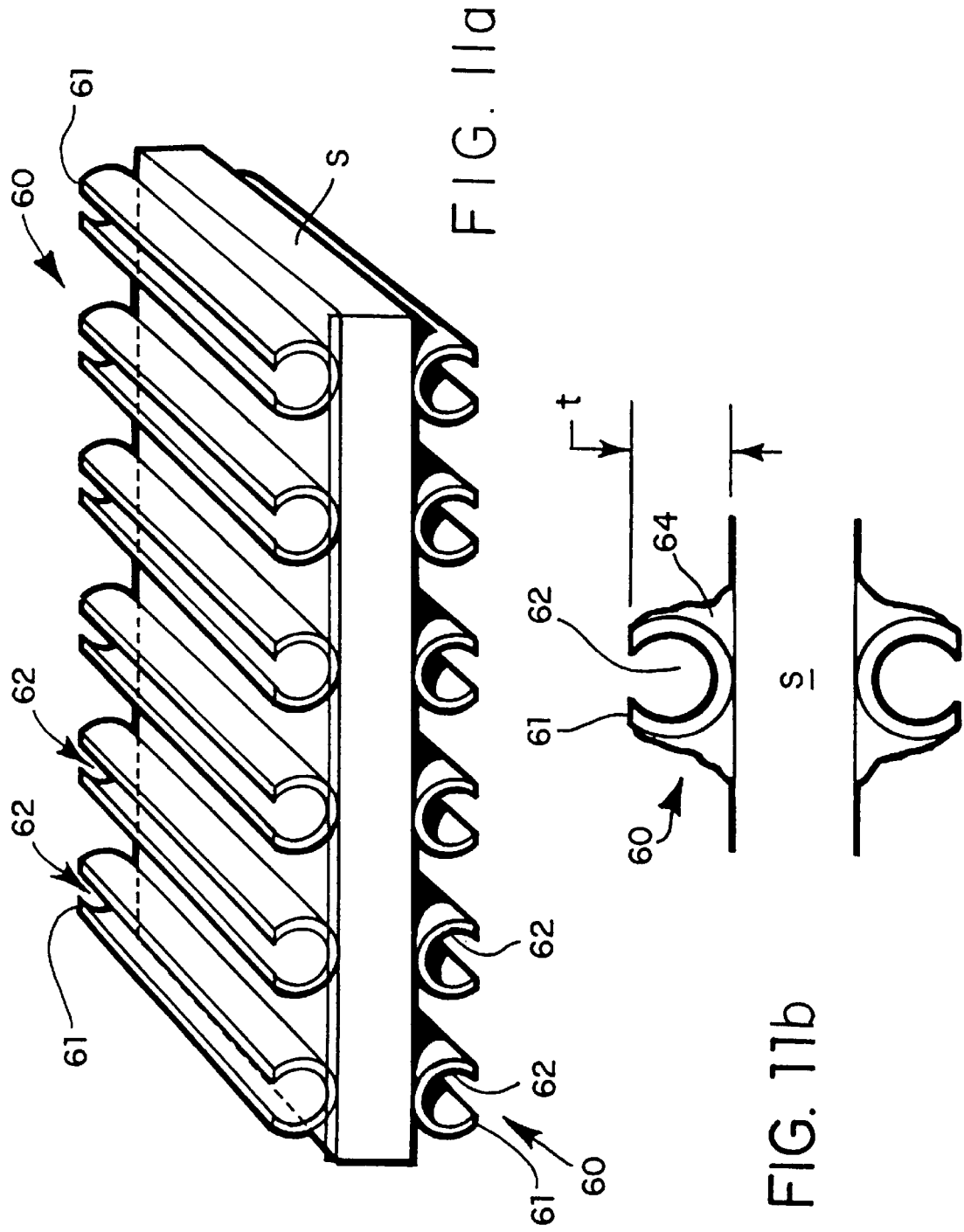

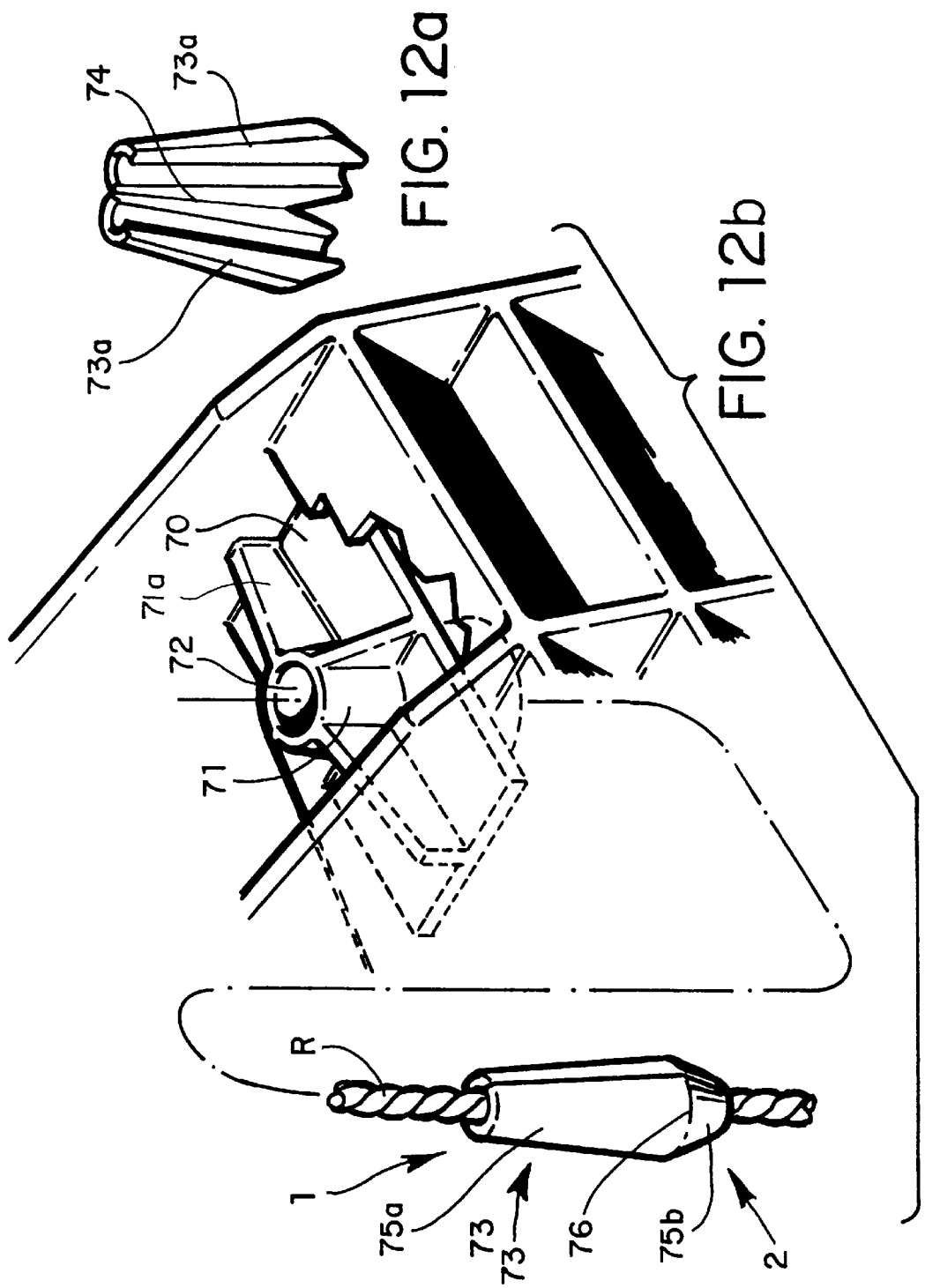

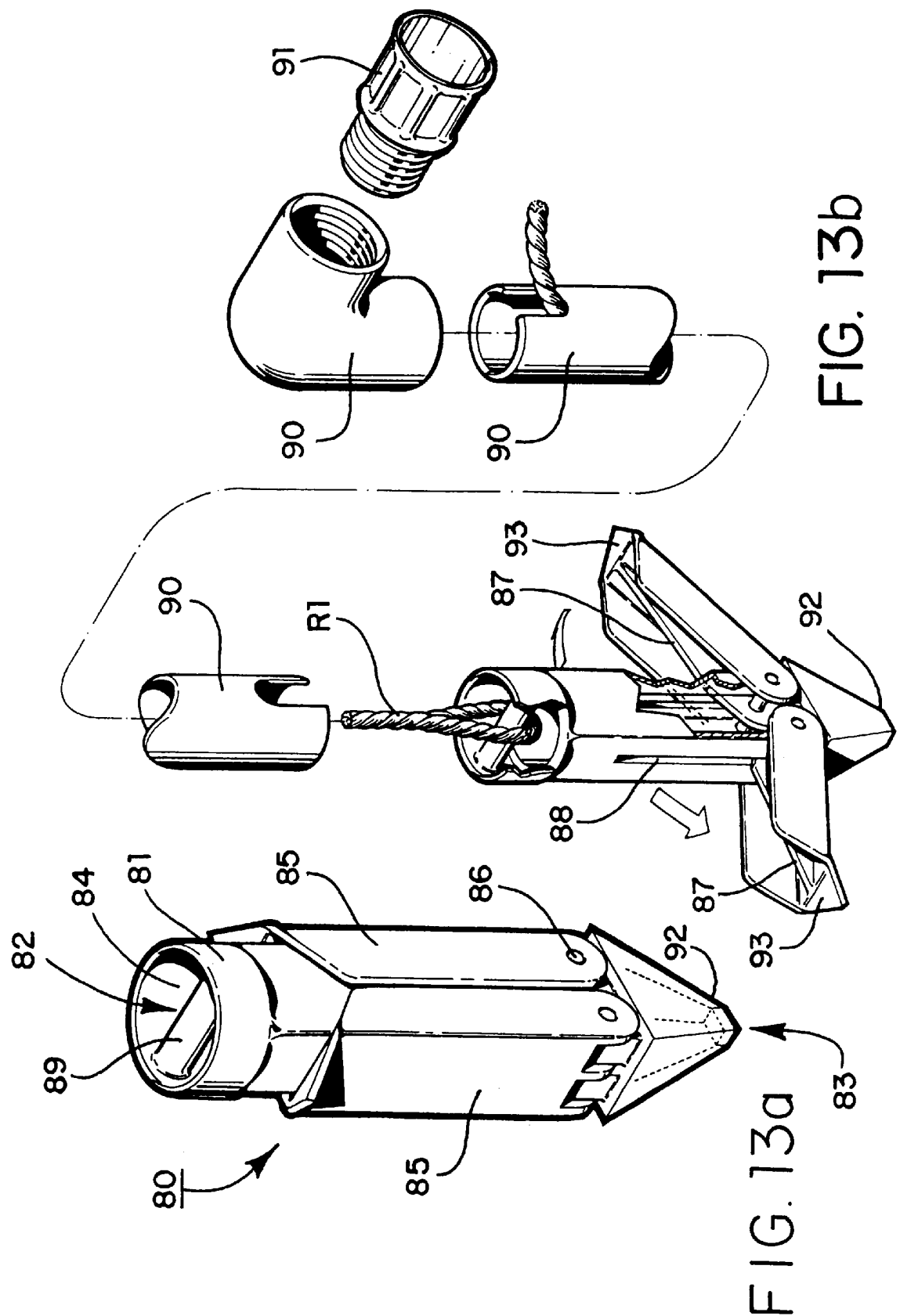

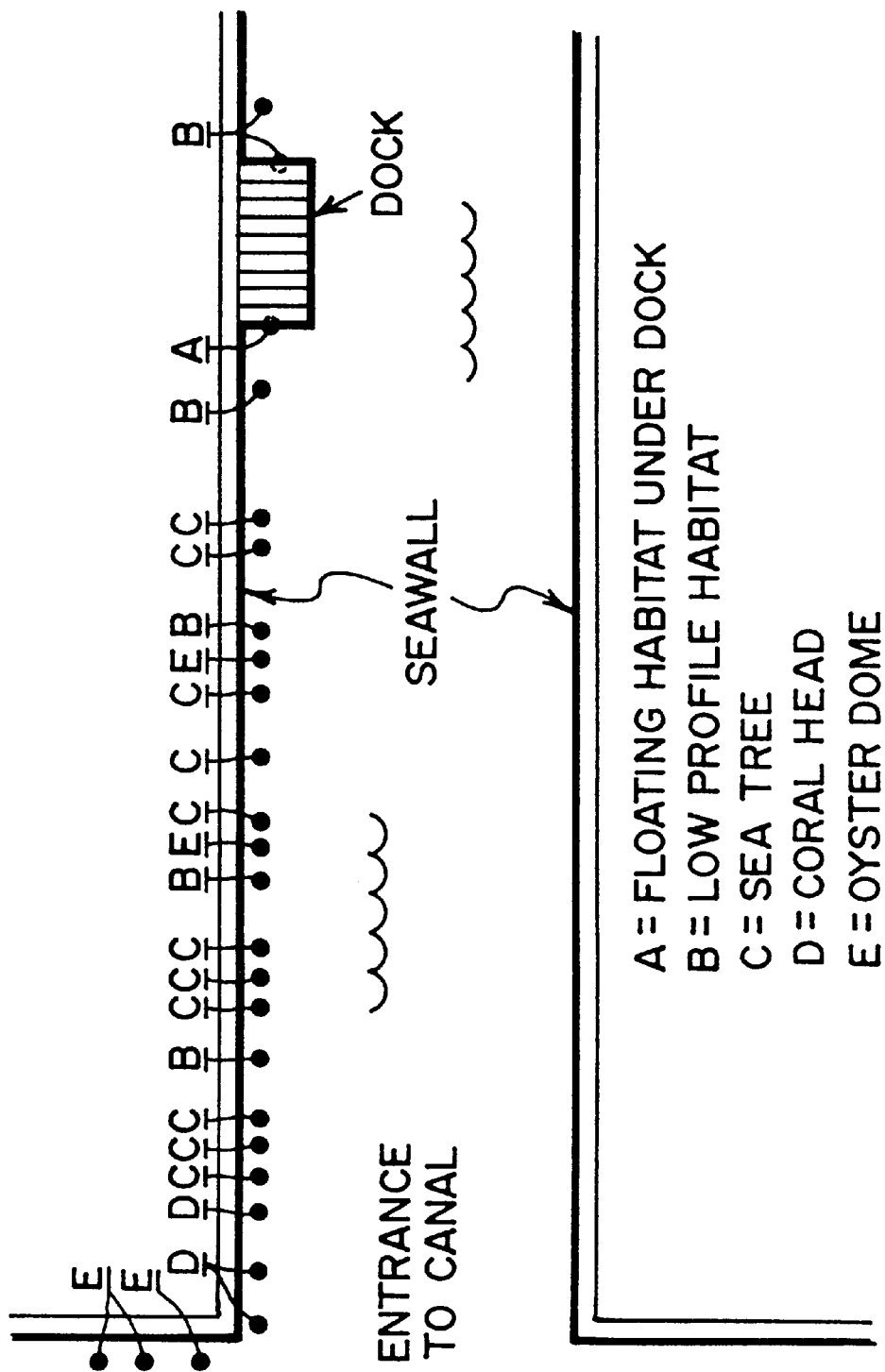

6,089,191

MARINE HABITAT SYSTEMS

This is application claims the benefit of the filing of co-pending U.S. provisional application Ser. No. 60/045,581, filed May 5, 1997.

I. BACKGROUND OF THE INVENTION

Approximately one-half of the United States' coastal wetland habitat has been lost to commercial and agricultural development. Due to this development, it is calculated that thousands of tons of nutrient-rich, storm water run-off flows from developed areas into coastal waters and has been identified as a primary cause of algae blooms. Excessive amounts of algae in the water can cloud the water, thus shading seagrasses from sunlight and consequently leading them to death. Certain coastal areas, in particular in Florida, have lost significant amounts of seagrasses, ranging from 30% to as high as 95%.

Destruction of the natural marine habitats is detrimental to the production, growth, and survival of marine animals therein, and consequently the losses of these natural habitats have been identified as the leading cause for the decline in marine resource populations. In addition, a growing human population, coupled with the health benefits of seafood, have increased fishing pressures to a point where numerous fisheries throughout the world have collapsed, leading to fishery closure and multi-million dollar negative impacts on the seafood industry.

As given in the Miriam-Webster Dictionary, an ecosystem is defined as "the complex of a community and its environment functioning as a unit in nature"; while ecology is defined as "1: a branch of science concerned with the interaction of organisms and their environment . . . 2: the pattern of relations between organisms and their environment. As given in *The Restoration of Aquatic Ecosystems* National Academy Press, Washington, DC, 1992, "restoration" is defined as "the return of an ecosystem to a close approximation of its condition prior to disturbance. In restoration, ecological damage to the resource is repaired. Merely recreating form without the function, or the function in an artificial configuration bearing little resemblance to a natural resource, does not constitute restoration. The goal is to emulate a natural, functioning, self-regulating system that is integrated with the ecological landscape in which it occurs."

Thus, there exists an ever increasing need to develop artificial marine habitat systems that function (1) to offset damage caused to the marine environment by past and new commercial coastal development, by the impact of bridges/causeways, and by commercial fishing; (2) to neutralize the impact of water pollution caused by cities; and (3) to aid in re-populating the oceans with various crustaceans, such as lobsters, crabs, oysters and other mollusks and various fishes.

II. SUMMARY OF THE INVENTION

The present invention is directed, in part, to a family of marine habitat structures of different designs that operate, as listed below, to rehabilitate and ultimately restore natural marine environments that have been destroyed by commercial development as well as to mitigate the damage caused by future development of coastal waters. The unique features of the inventive habitat systems include:

(1) Different structural designs that encourage the settlement of different types of naturally occurring aquatic species (larval and post-larval). The inventive habitats are thus both "species specific" in the life forms they will support as well as "self-stocking" in that no external forces are required to encourage the settlement of such animals other than the design of the habitat itself.

(2) The inventive habitats have specifically designed macro- and micro-substrates to encourage the settlement and survival of "bio-fouling" organisms, such as sea squirts, barnacles, oysters, mussels, sponge, and the like. These "filter-feeding" animals act like "artificial kidneys" by eating naturally occurring single cell algae (i.e. phytoplankton)—the same algae which, as discussed above, if in overabundance will shade out, and thus eventually kill, sea grasses necessary for the maintenance of coastal marine habitats. By clearing the water of algae, more sunlight can penetrate the water to the bottom to aid in the growth and survival of sea grasses. Moreover, the waste from these filter-feeding animals become the food source for a very large number of small crustaceans, crabs, and shrimp, which in turn become the food source for desirable fish, or in the case of crabs and shrimp, fishery products.

(3) As marine animals in the larvae and post-larvae state develop within the inventive marine habitat systems to a state at which can they can survive on their own in adult fishery stocks, the special design of the inventive habitats cause these older, and thus larger, marine animals to be "forced" out of the inventive structures as they are no longer able to fit within the structures. This makes the inventive habitat "self-producing" of viable, out-going juveniles.

Thus, the inventive marine habitat system comprises using combinations of different individual habitat units. Specifically, the marine habitat system of the present invention comprises employing a plurality of different habitat units which, when placed in a particular body of water in need of restoration, work in concert with one another to achieve coherent restoration of damaged ecosystems. The present invention, in certain aspects, includes a method for aiding in the restoration of aquatic ecosystems by placing in a body of water a marine habitat system including:

(a) a floating habitat structure comprising a plurality of transverse plates vertically disposed between adjacent vertical plates, wherein the transverse and vertical plates, in combination, define a plurality of housing compartments configured to house young aquatic animals; and (b) a second habitat structure having a configuration different from the floating habitat structure and positioned below the floating habitat. The second habitat structure further includes a plurality of transverse plates vertically disposed between adjacent brackets, the combination of which define a plurality of housing compartments configured to house aquatic animals too large for the floating habitat structure to shelter.

Additionally, the inventive method may further include placing a third marine habitat unit in a restorative area of a body of water, wherein unit has a configuration different from that of the floating and second marine habitat structures. Here, the third marine habitat structure, or "sea tree" habitat unit as referred herein, has a top and bottom end and further includes:

(a) a longitudinal tube defining an inner chamber; and (b) a series of plates vertically spaced apart about the tube, wherein the tube is centrally positioned through each of the series of plates; and further, wherein the sea tree unit has a diameter defined by the series plates and increases from the top end to the bottom end of the unit, resulting in a structure having an overall conical or "tree-like" configuration.

The marine habitat system employed in the inventive method may further include a fourth marine habitat structure, specifically a habitat unit having from about five to about eight sides, most preferably a hexagonal habitat unit have six sides, wherein the unit has a top end and a bottom end and further includes:

(a) a frame positioned on the top end of the unit and a base portion positioned parallel to the top frame; and (b) from about five to about eight, most preferably six, sides defined by at least two longitudinal support members positioned on each of said sides, each of the two longitudinal support members further having an upper end integral with the top frame and an inferior end integral with the base portion;

The side portions of the fourth habitat unite include a front side portion and a back side portion directly opposite the front portion, each of which further includes a plurality of vertical slats disposed between adjacent longitudinal support members and integral with the top frame and base portion.

Other aspects of the present invention include the manufacture of each system, most preferably via injection molding, into one piece with no moving parts, thereby increasing the durability of the habitat units in the marine environment. The present invention also employs novel anchoring and anti-chafe mechanisms.

III. BRIEF DESCRIPTION OF THE FIGURES

FIGS. 4a–4b illustrate the pipe assembly for securing an anchoring rope to the floating habitat unit shown in FIGS. 1–3.

FIG. 5b is a partial end view of the habitat unit shown in FIG. 5a.

FIGS. 6a–6b, in combination, are a perspective view of the sea tree habitat unit, including the anchoring assembly employed with the habitat unit.

Figure 7:
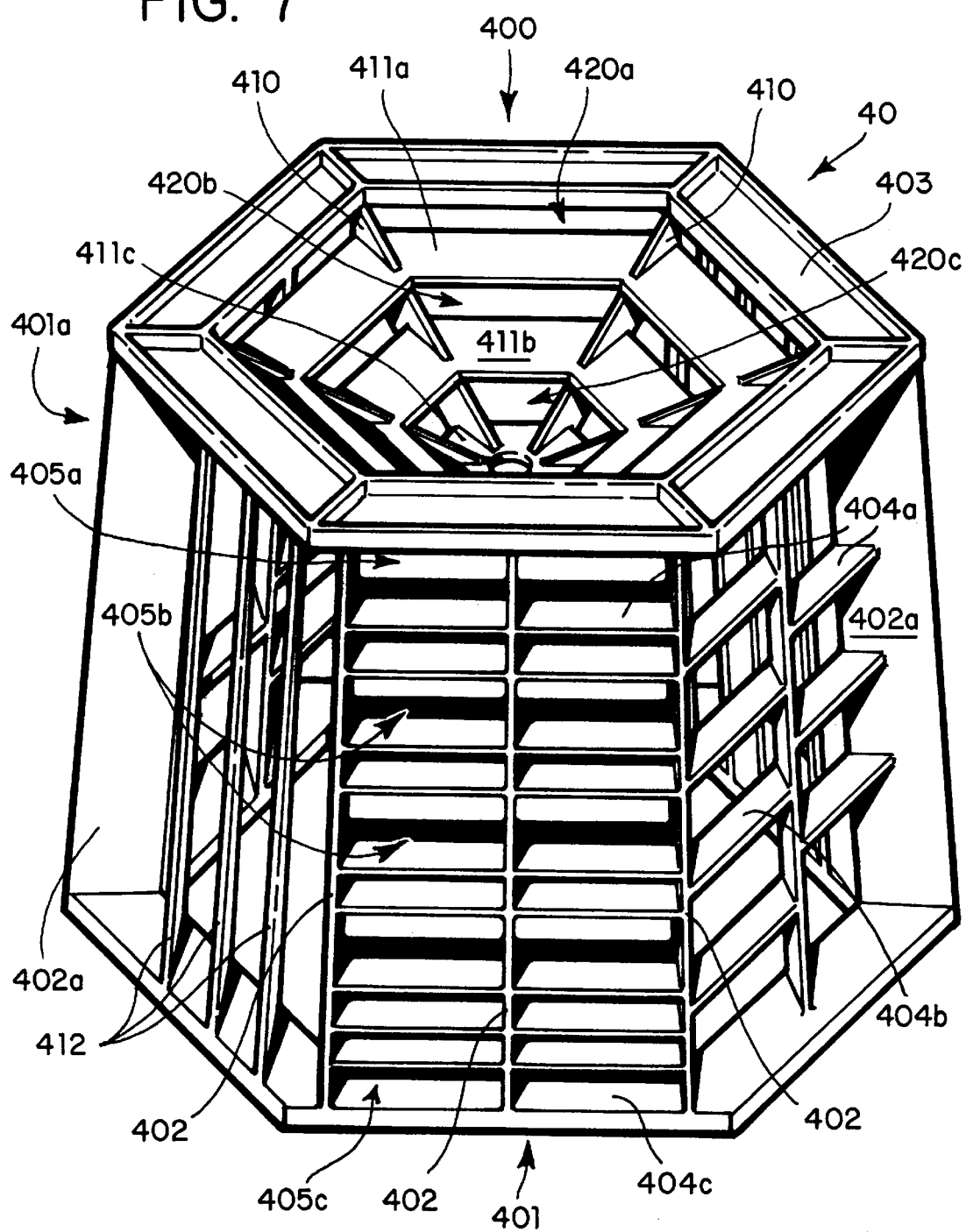

FIG. 7 is a perspective view of the coral head habitat unit.

Figure 8:
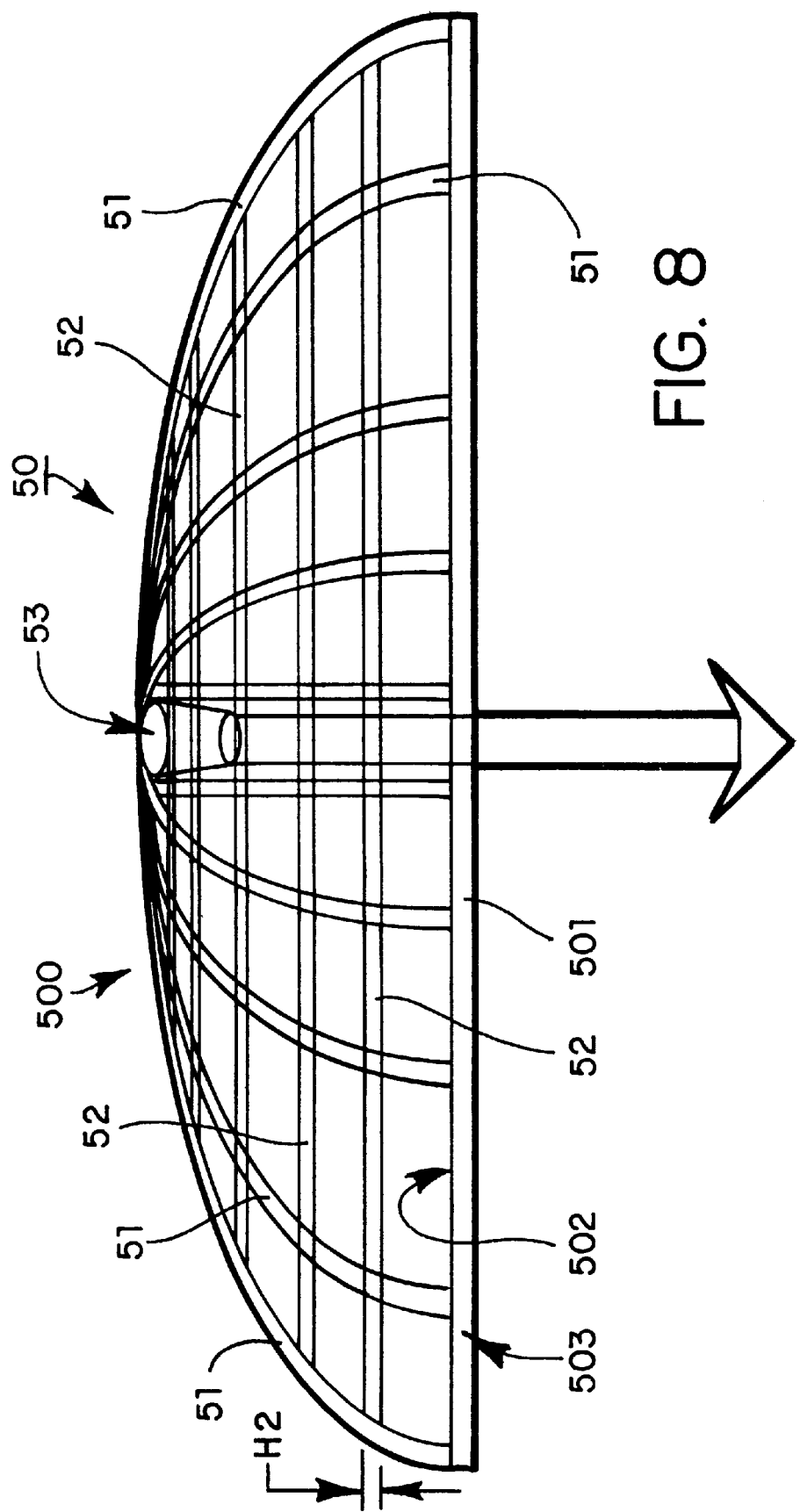

FIG. 8 is a side schematic view of an oyster dome.

Figure 9:
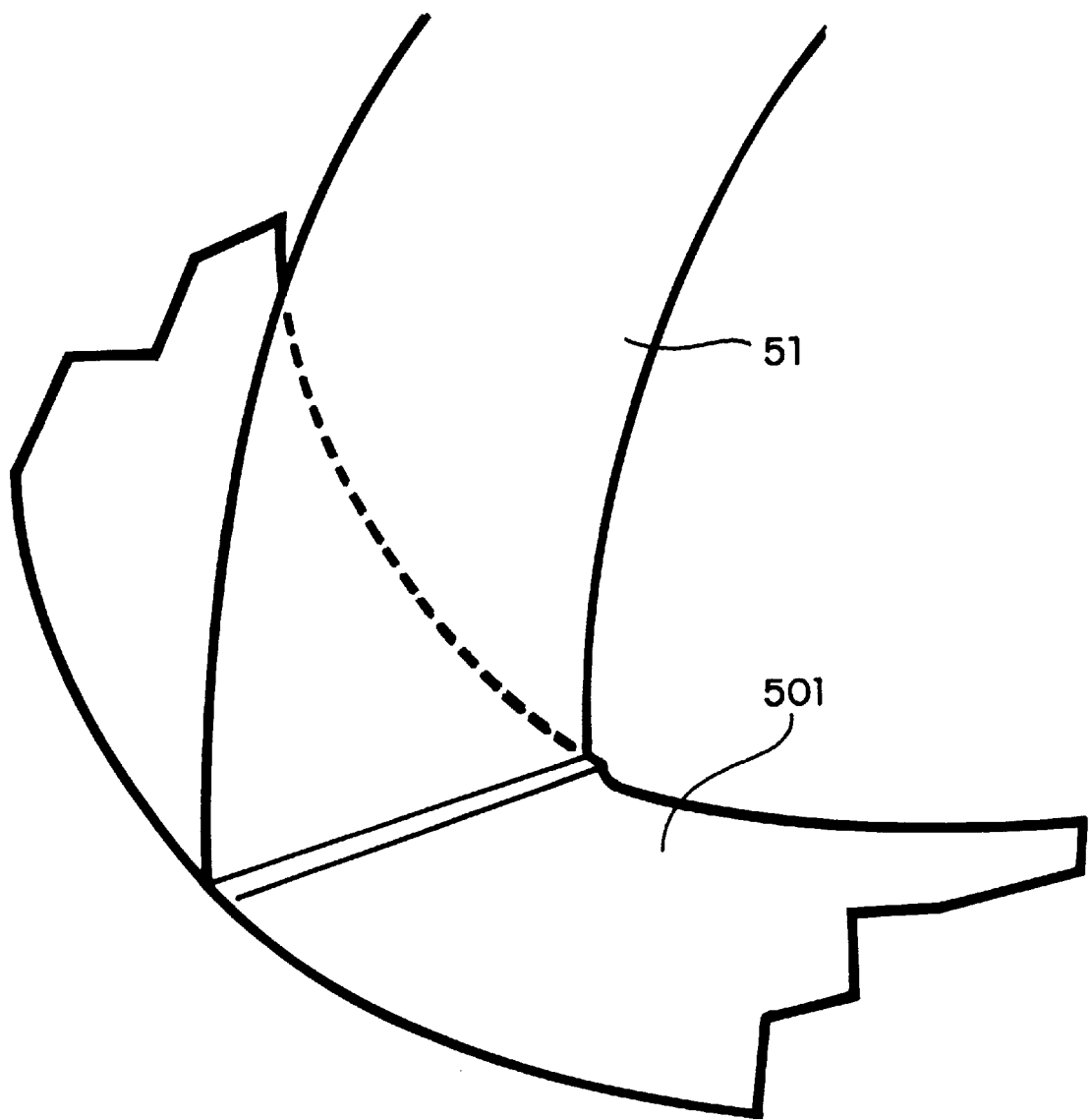

FIG. 9 is a magnified, partial view of the oyster dome of FIG. 8, illustrating the attachment of the vertical rib to the platform of the dome.

Figure 10:
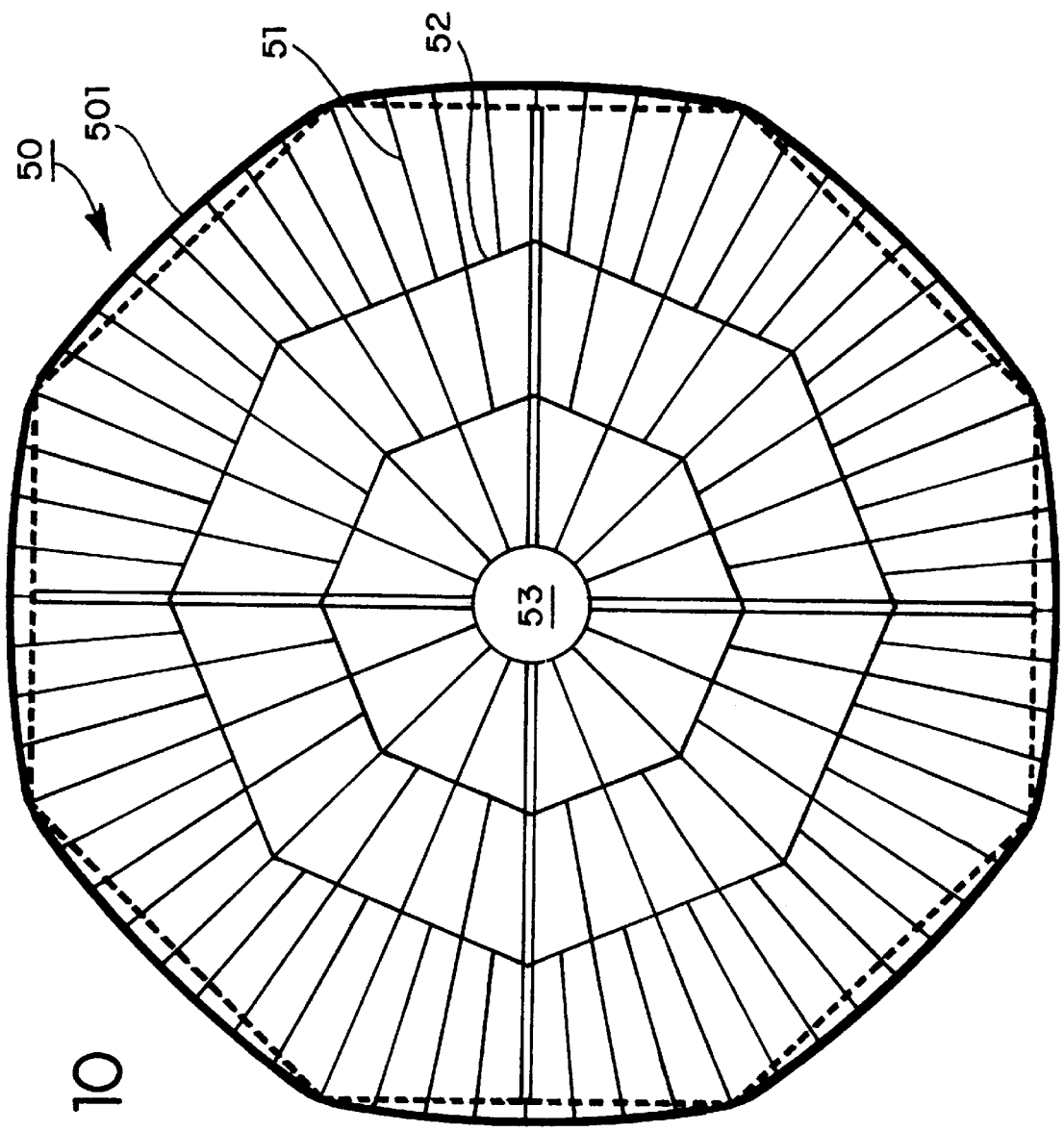

FIG. 10 is a top view of the oyster dome shown in FIG. 8.

FIG. 11a is a perspective view of a series of suitable microsubstrates for use in combination with the inventive habitat units.

FIG. 11b is a partial front end view of the microsubstrate.

FIGS. 12a–12b illustrate the anti-chafe device for use in combination with the inventive habitat units.

FIGS. 13a–13b illustrate the anchoring system for use with the low profile and coral head units.

FIG. 14 is a schematic view showing a preferred placement of the various inventive marine habitat units within a canal.

IV. DETAILED DESCRIPTION OF THE PREFERRED EMBODIMENTS

A. The Marine Habitat Systems

The inventive marine habitat systems comprise a number of different structures designed for placement into a body of water in need of restoration due to previous destruction by the creation of massive algae blooms generally resulting from commercial activity (e.g. dredging, seawalls, nutrient rich stormwater runoff from developed areas, and agriculture). As discussed above, this algae can cause massive fish kills in itself, and further prevents sunlight from reaching the bottom of bays, leading to the massive death of seagrasses and other plant life dependent upon adequate sunlight for photosynthesis as well as the entire ecosystem interwoven with such plants. As used herein, the phrase "body of water" includes, but is not limited to, oceans, rivers, bays, lakes, and estuaries and the like.

Each of the inventive marine habitat systems used in the present invention has particular characteristics for a variety of different marine animals.

The following sections will describe the preferred marine habitat systems, which most preferably are used in combination with one another as a "family," to restore a particular area of a body of water that has been destroyed as described above, for example.

1. Floating Habitat System:

Docks provide shade in seawalled canals where there is no other shade. This man-made shade mimics the shade provided, for example, by the branches of mangrove trees CSS and roots which hang over the water. The naturally occurring, free-swimming /drifting larvae of the "biofouling community" of marine animals, comprising of about 70 or more species, seek out such shade as they instinctively ride incoming tides, very near the surface of the water, in search of nursery habitat. In the undisturbed natural system of estuarine mangroves, they would normally attach to the solid, structured, shaded habitat of mangrove proproots.

However, throughout the coastal United States, for example, about one-half of the esturarian habitat has been destroyed and replaced with flat seawalls and docks. While docks provide some shade as described above, only a small percentage of the bio-fouling community (e.g. sea squirts, oysters, mussels, sponges, and the like) is able to survive and thrive in such flat, vertical seawalls under docks are not conducive to sheltering the vast majority of these larvae (e.g. oysters and barnacles).

Thus, the first embodiment of the present invention is a floating habitat system 10 preferably placed near the top surface of the water, most preferably under these docks, to thereby serve as a "surrogate nursery." Specifically, the young animals can attach to the unit and therein safely undergo metamorphosis to the adult form and survive thereafter. The following discussion will describe the preferred design of the floating habitat system as well as describe further its effects on aquatic ecosystem restoration as applied to the other inventive marine habitat systems described later herein.

Figure 1:
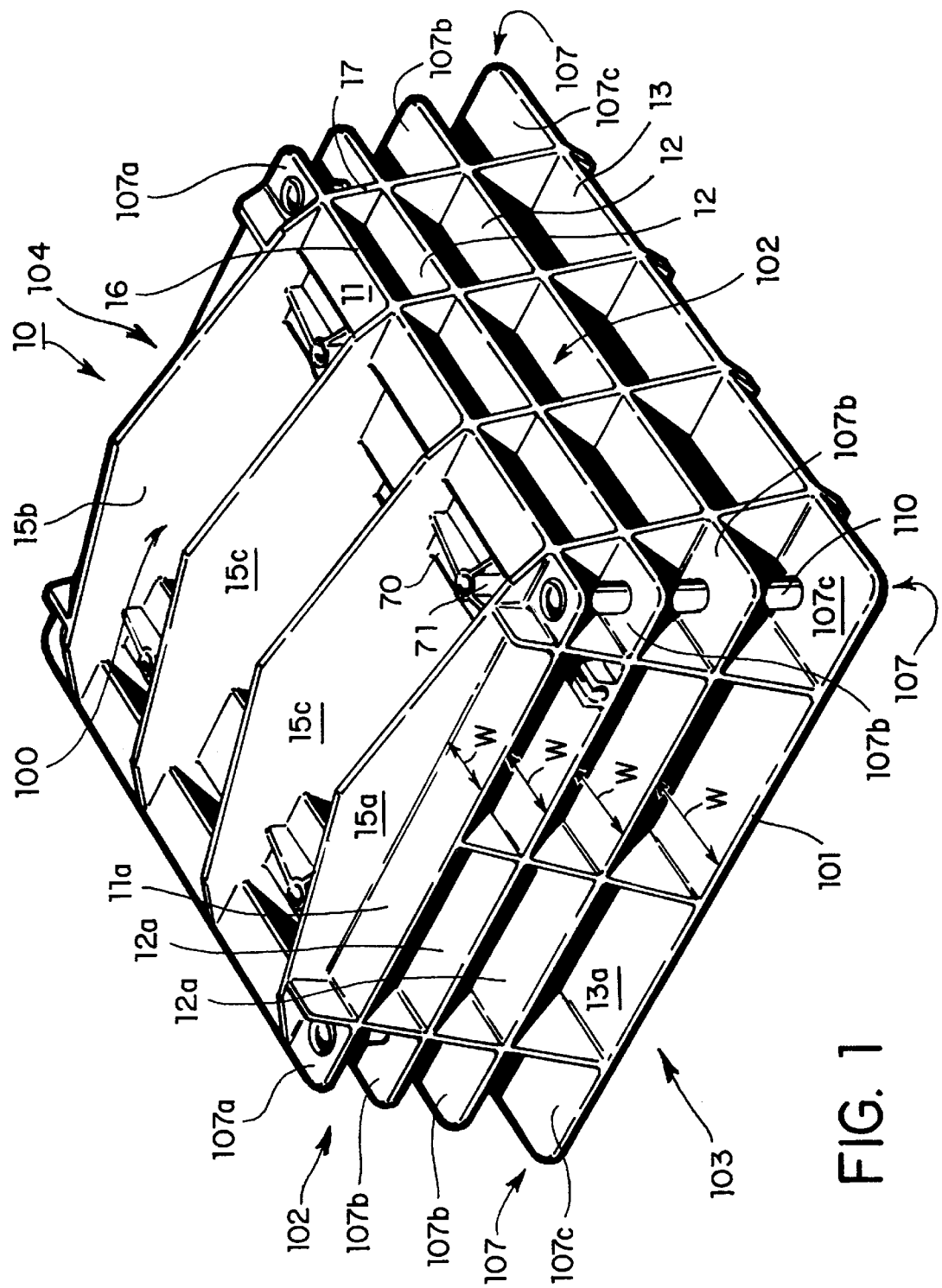
FIG. 1 illustrates a perspective view of the floating habitat unit.
Figure 2:
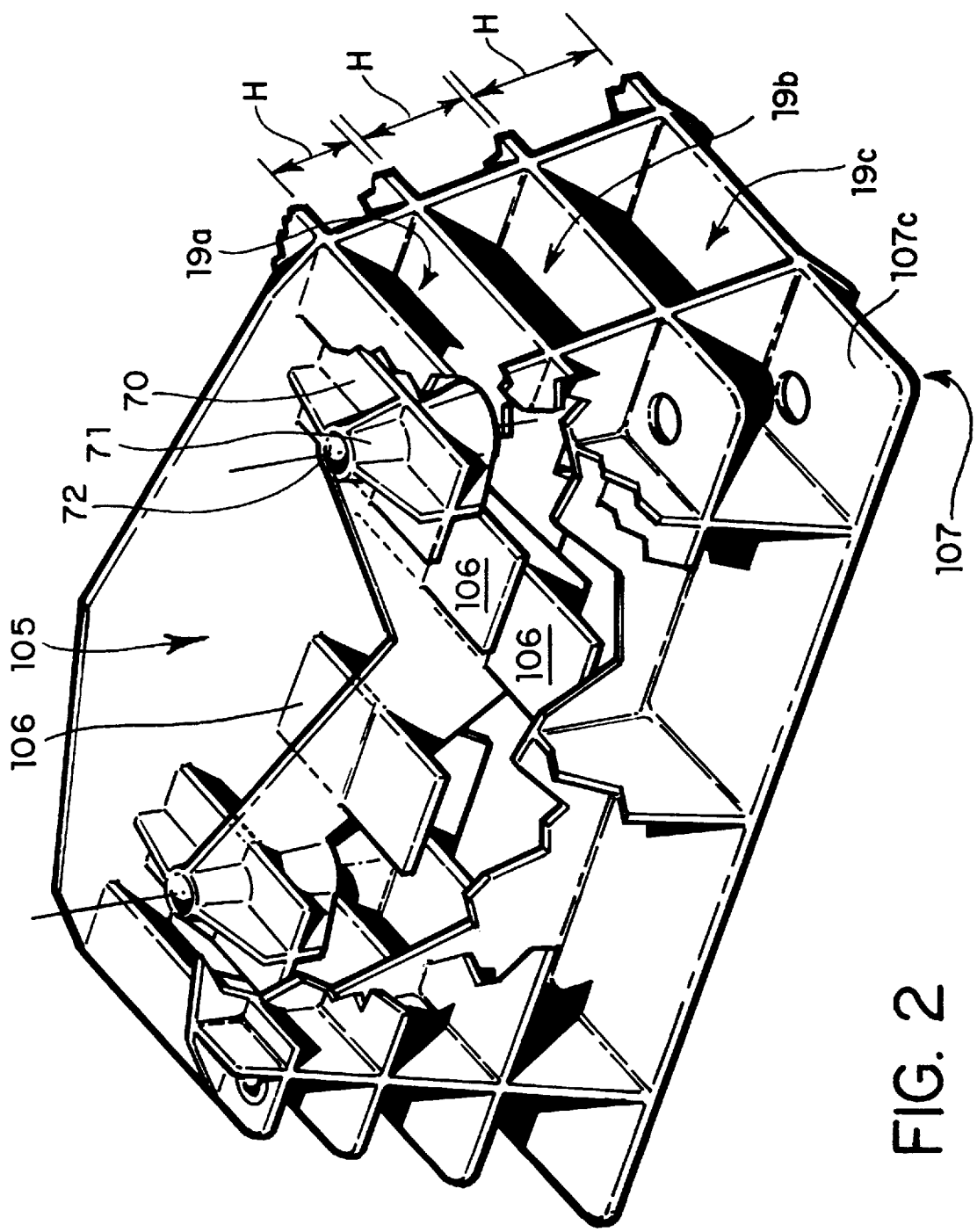
FIG. 2 illustrates a partial section of the floating habitat unit of FIG. 1.
Figure 3:
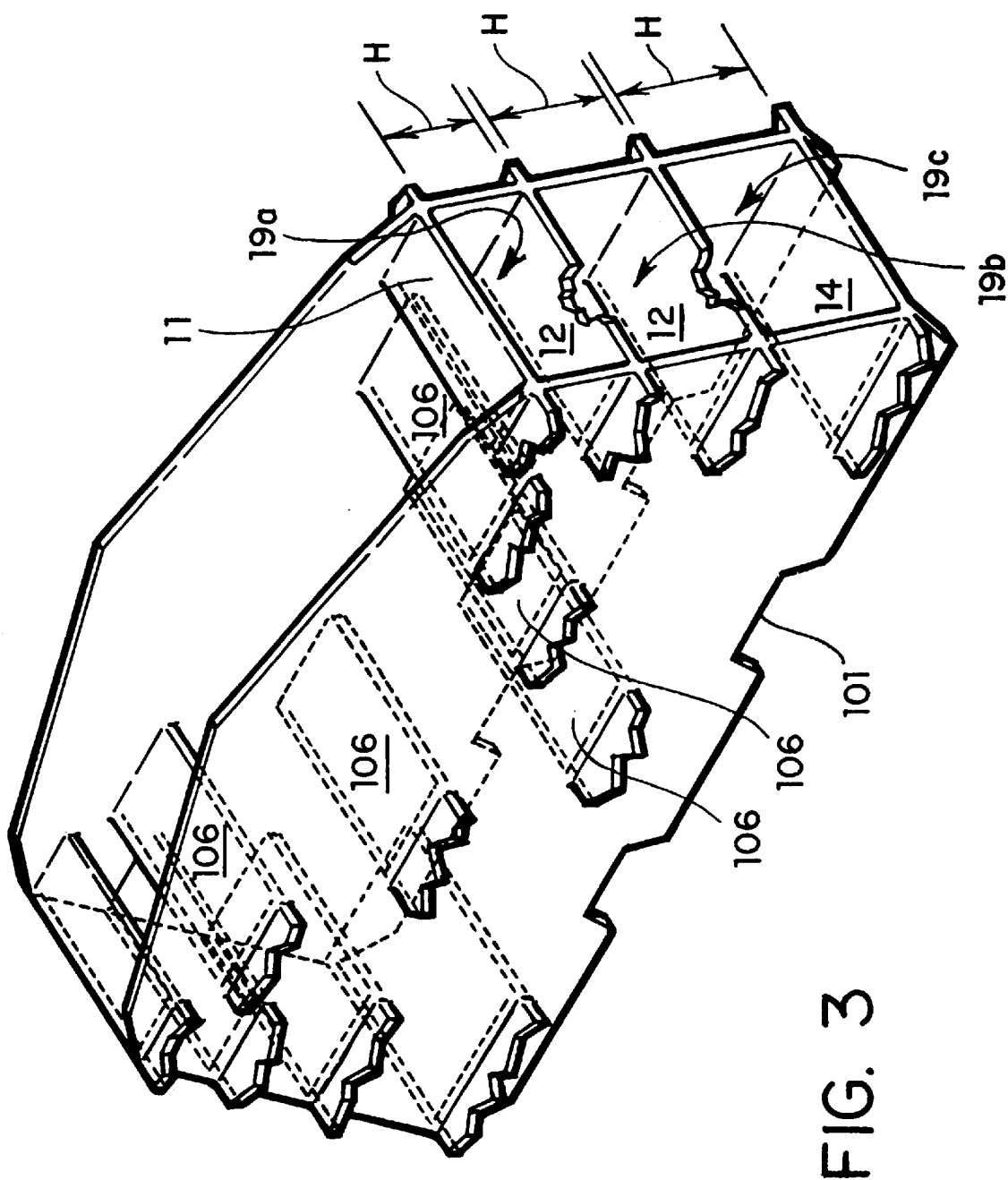
FIG. 3 is another partial section view of the floating habitat unit of FIGS. 1 and 2 showing the structural reinforcement slats and transverse plates.

Referring now to FIGS. 1–3, the floating habitat unit (10) comprises a plurality of transverse plates (11–13, 11a–13a) vertically disposed between adjacent vertical plates (15a–15c), which, in combination, define a plurality of housing compartments (19a–19c) configured to shelter young marine animals, in particular those of the bio-fouling community, as discussed above. More specifically, the floating habitat unit comprises a top end (100), a bottom end (101), and two sides (102). The unit further includes a plurality of vertical plates (15a–15c) positioned parallel to one another. Adjacent vertical plates are further separated a distance from one another to define a space (105) therebetween. The unit (10) further includes a front plate (15a) and a rear plate (15b), each of which has outer walls which define the front end and rear end of the unit, respectively.

The floating habitat unit further includes a plurality of transverse plates disposed within each of the spaces (105) defined by adjacent vertical plates. As illustrated, each transverse plate (11–13) is perpendicularly connected to adjacent vertical plates (15a–15c. The transverse plates include a series of outer plates, as shown in FIG. 1, positioned along the outer sides (102) and front (103) and rear (104) sides of the unit. As illustrated, these transverse plates are arranged vertically between the adjacent vertical plates (15a–15c). Preferably, the outer edge (16) of each transverse outer plate is substantially flush with the side edge (17) of each of the adjacent vertical plates.

The top plate (11), bottom plate (13), and each of the inner plates (12) are spaced a distance apart vertically to define top (19a), bottom (19c), and inner housing (19b) compartments (FIG. 2). The height (H) of each of the housing compartments is sufficient to shelter a variety of bio-fouling animals, particularly those in the larval stage. More preferably, the height of each of said housing compartments is increasingly larger from the top end (100) to the bottom end (101) of the unit.

Moreover, as shown in the figures, the top plate (11) partially overlaps the subjacent inner plate (12), and each of the inner plates (12) partially overlaps subjacent inner plates and the bottom plate (13), thereby creating a "stairstep" arrangement of these transverse plates along the sides (102) and front (103) and rear (104) sides of the unit.

The front (15a) and rear (15b) vertical plates of the unit also include a series of transverse plates (11a–13a) integral therewith. Further, the front (103) and rear (104) ends of the unit are identical, as are opposing sides (102) of the unit. Like the side transverse plates, the front and rear series of transverse plates include top (11a) and bottom (13a) plates and at least one inner plate (12a) disposed therebetween, wherein the widths (w) of the plates are increasingly larger from the top end to the bottom end of the unit. Consequently, the top plate (11a) partially overlaps a subjacent inner plate, and each of the inner plates partially overlaps subjacent inner plates and the bottom plate, thereby resulting in a stairstep arrangement of transverse plates along the outer walls of the front (15a and rear (15b) vertical plates of the unit.

As illustrated more clearly in FIGS. 2–3, the floating unit preferably includes a series of transverse reinforcement members (106) disposed between adjacent vertical plates to add support and improve the structural integrity of the unit. As shown, each of the members (106) is preferably offset a distance laterally and longitudinally in a "V-shape" orientation within the inner spaces (105) defined by adjacent vertical plates.

The floating habitat unit (10) is designed to float near the surface of the water. Preferably, floatation devices (not shown), such as buoys, for example, are secured to the unit. In the most preferred embodiment, as shown in FIGS. 1 and 4a–4b, the unit includes a pipe (110) which is not integrally formed with the habitat unit during manufacture, but separately formed as shown by the arrow (FIG. 4) and subsequently inserted through each recessed corner (107), thereby extending from the top end to the bottom end of the unit. Each corner further includes a series of platforms (107a–107c) through which the pipe (110) is disposed vertically for receiving a means for attaching the floatation devices as well as additional habitat systems. Provision of this pipe (110) for receiving an anchoring rope, for example, allows the rope to move freely within the pipe without chafing the habitat unit. Instead, the pipe is sacrificially chafed, and thus may later be disdcarded and replaced with a new pipe (110).

Preferably, more than one floating habitat unit ( ) is employed in a restorative area of a water body, wherein the separate units are attached to each other vertically via some attachment means such as rope or cord, for example, which advanced through the pipe (110), as discussed above. As in the preceding paragraph, the top floating unit employed is further attached to a floatation device, such as a buoy, so that it may float near the surface of the water. The floating habitat unit is preferably placed underneath docks or along seawalls in man-made canal systems (FIG. 14); however, it can also be placed in open bay/estuarian waters, provided it does not pose a hazard to navigation.

Uniquely, because this unit floats 24 hours per day at the surface where oxygen is consistently at its highest levels, and is never exposed at low tide, the bio-fouling community of animals (discussed in the next paragraph) has been documented as extraordinarily lush, and per unit area, one of the most biologically diverse to be found, with counts of over 150,000 macroscopic animals represented by 60 to 70 or more species per ¼ square meter. The ecology of the floating habitat is as follows:

(a) The primary mass of the animals that attach to the habitat is comprised of tunicates (sea squirts), oysters, mussels, sponges and the like. These are all filter-feeders and strain micro-algae (phytoplankton), in addition to bacteria and viruses, from the water. As discussed above, this algae is detrimental to the many natural bay areas. We have discovered that a single ¼ square meter habitat supports enough of these filter-feeders to strain the phytoplankton from up to 20,000 gallons of bay waters per day.

(b) After this algae passes through the digestive system of the filter-feeders, it is excreted in the form of fecal pellets; analogous to a cow producing "cow pies". In an undisturbed estuarian ecosystem, decaying mangrove leaves, seagrass or marsh grass form the base of the food chain for the ecosystem. Scientifically, this decaying seagrass, etc. is called detritus, and is the primary food source for a myriad of animals called detritivores. This group of animals is comprised of animals such as marine worms, crustaceans such as amphipods, shrimp and certain crabs, and the like. Through gut analysis of such detritivores living on the floating habitat, we have discovered that the filter-feeder's fecal pellets act in a virtually identical manner in the food chain as natural seagrass, etc. detritus. By making each transverse plate in the floating habitat unit (going from top to bottom) extend out a little further than the one above, a greater amount of the fecal pellets can be captured within the habitat's framework, increasing the food availability for the detritovores, and thereby increasing the number of detritivores and the carrying capacity and biological diversity of the entire habitat unit which is based upon this food source.

Further gut analysis of top predators found living on the floating habitat unit, such as the commercially important Florida stone crab, have revealed that such detritivores were primary prey animals. The same chain of events also happens with numerous species of larval, postlarval, and juvenile fish which settle in the floating habitat. The ecological processes described above occur in an entirely natural manner. Since the floating habitat units are placed in the water as barren, "virgin" structures, in relationship to the definition of restoration, the floating habitat unit emulates a natural, functioning system.

The preferred overall dimension of the floating habitat unit is about 2 feet (length)×2 feet (width)×9 inches (height). The height or distance between subjacent transverse plates positioned on the sides and front and rear walls of the unit preferably ranges from about 1.5 inches to about 3 inches, depending upon restoration site-specific variables such as very low salinity, where small mussels will be the predominant bio-fouling organism, for example, thereby requiring smaller heights of about 1.5 inches. In higher salinity waters, where much larger sea squirts will comprise the main biofouling assemblage, larger distances of 3 inches are preferred between transverse plates.

The foregoing dimensions of the floating habitat are important for optimal operation and critical in making the habitat unit a self-regulating system which naturally ejects animals beyond the stage of nursery development, yet maintains the bio-fouling community required to sustain their development until the next growth state. For example, a floating habitat that is significantly smaller will not induce desirable postlarval fish and bio-fouling animals to settle and subsequently utilize the unit as a nursery habitat. If the transverse plates are too close together, the habitat unit will "clog" with bio-fouling organisms, which creates a "dead zone" in the center of the unit, thereby leaving little room for other commercially, recreationally, or otherwise important organisms. Stone crabs, for example, will be "ejected" from the habitat unit at too young a stage of development if the transverse plates are too close together, therein becoming easy prey for bottom dwelling fish. Conversely, larger habitat units act as "artificial reefs" (designed generally for offshore placement for larger fish), and thus attract too many predators, which in turn, prey on desirable young fish, etc, thus defeating the purpose of this habitat unit as a nursery habitat. Moreover, if the plates are too far apart, we have discovered that the bio-fouling assemblage will not tend to settle on the unit, or if larvae do attach, they do not tend to survive. Thus, it is preferred that the floating habitat unit not be larger than ¼ square meter.

Furthermore, and of great significance regarding the last portion of the definition of restoration, in which the restorative effort "is integrated within the ecological landscape in which it occurs.", the enormous capacity of the habitat's phytoplankton filtering capacity plays a significant role. By removing such excess (i.e. human-caused) algae from the water column, we have documented that the water becomes significantly clearer, allowing for sunlight penetration to reach greater depths (i.e., the bottom floor of the water system). With adequate sunlight penetration to the bottom, the restoration of bottom dwelling seagrasses and the enormous variety and numbers, including commercially, recreationally or otherwise important fishes can take place on its own. In turn, this could begin the restoration of the multi-billion dollar fisheries which have or are beginning to collapse due to natural marine habitat destruction and other adverse human activities.

Figure 5A:
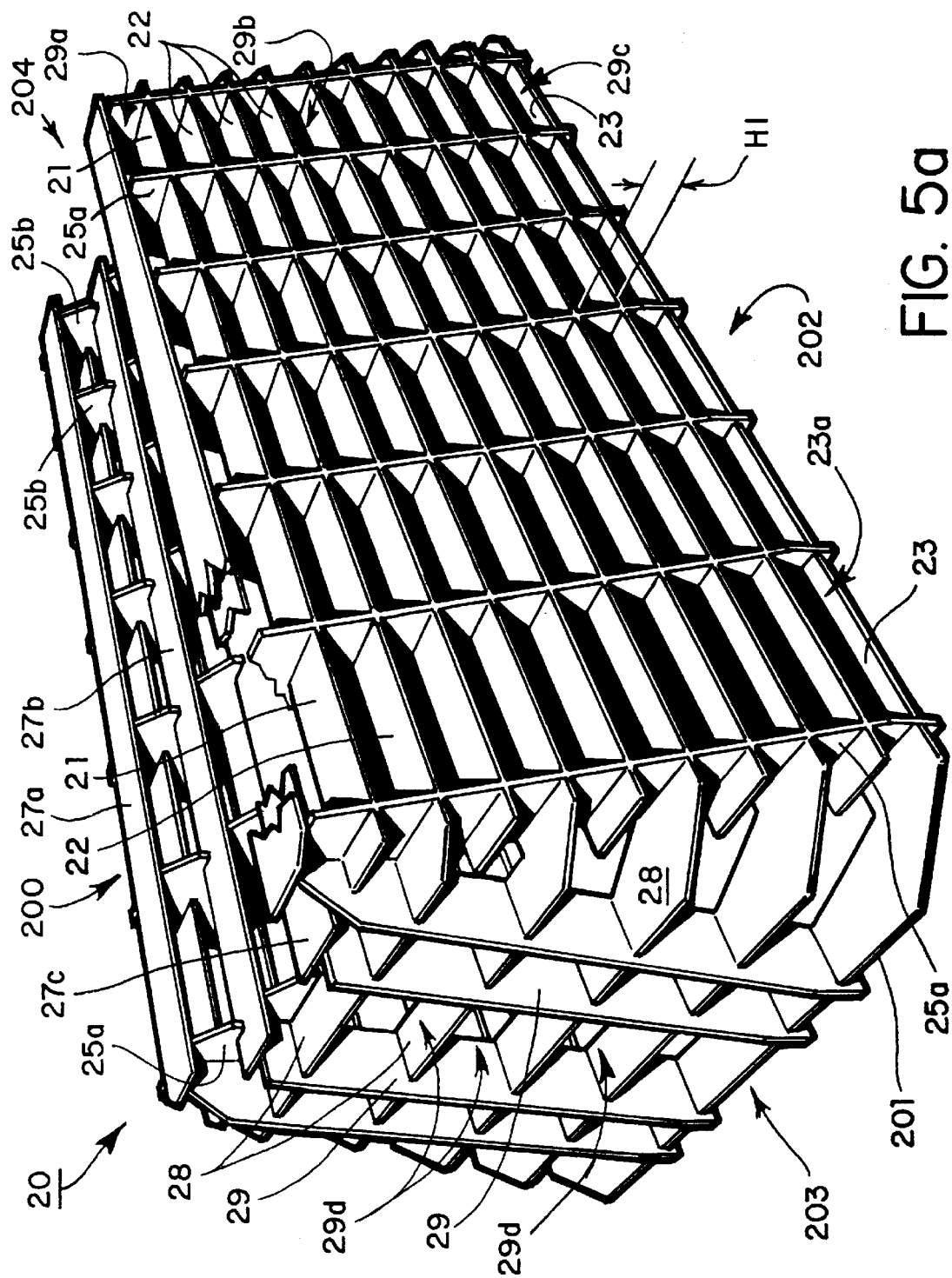
FIG. 5a is a perspective view of a low profile habitat unit.
Figure 5B:
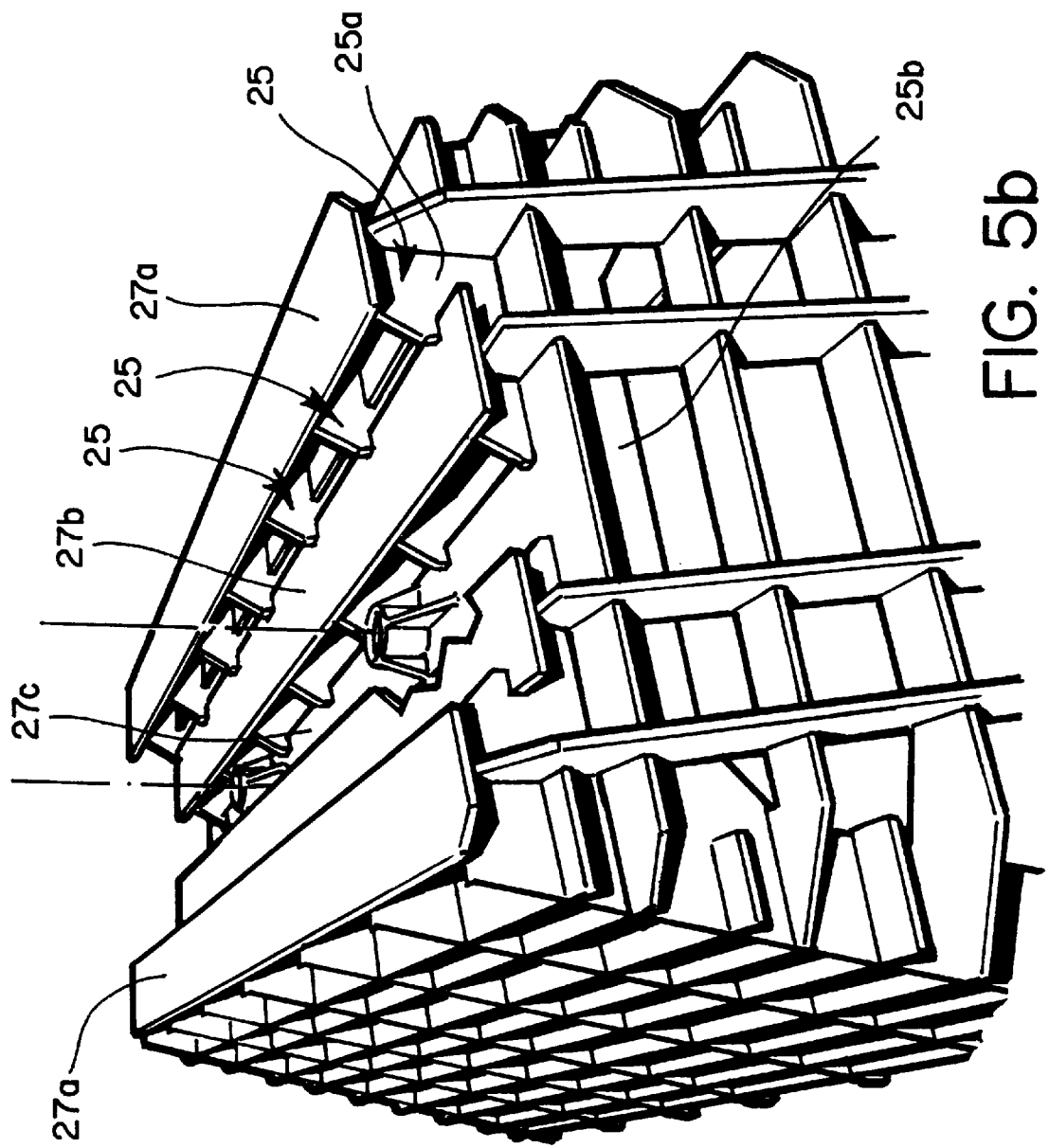

2. Low-Profile" Habitat Unit:

A second embodiment of the inventive marine habitat system has a different configuration than the floating habitat unit and is preferably employed below the floating habitat unit. As shown in FIGS. 5a–5b, the second habitat (20), referred herein as the "low profile" unit, is designed to serve as a habitat for fish, crustaceans, and the like which have developed past nursery development in the floating habitat unit (10) and thus can no longer "fit" in the floating habitat unit. Moreover, it is the natural instinct for such fish, etc. to move to deeper water as they progress through their life cycles, and thus this low profile habitat is further designed to be anchored to the bottom of the restorative area of water discussed below).

The low profile unit (20) includes a plurality of transverse plates (21–23) vertically disposed between adjacent vertical brackets (25). The combination of transverse plates and vertical plates further define a plurality of housing compartments (29a–29c) configured to house aquatic animals too large for the floating habitat unit, as discussed above.

More specifically, the low profile unit comprises a top end (200), front (203) and rear (204) ends integral with the top end, and two side ends (202) integral with the top, front, and rear ends. As discussed above, the unit preferably further includes a plurality of brackets (25) positioned parallel to one another and between the front and rear ends of the unit. Each bracket has two vertical planar members (25a), each of which are positioned on opposite sides of the unit, and a horizontal planar member (25b) connecting the adjacent vertical members to one another along the top end (200) of the unit. The low profile unit further includes a first plurality of transverse plates (21–23) disposed vertically from the top (200) to the bottom (201) end of the unit between adjacent brackets (25) along each of the sides (202) of the unit. The first plurality of transverse plates further includes a top plate (21), a bottom plate (23), and at least one inner plate (22) disposed between the top and bottom plates.

As for the floating habitat unit, the top plate (21) and each of the inner plates (22) are spaced a distance apart from one another to define a top housing compartment (29a) and inner housing compartments (29b), respectively. Moreover, the bottom plate (23) is spaced a distance apart from a superjacent inner plate to define a bottom housing compartment (29c). The distances between the transverse plates, or height (H1) of the housing compartments, increases from the top end (200) of the unit to the bottom end (201) of the unit. Moreover, the housing compartments are in communication with the hollow interior of the habitat unit defined by the brackets. Also like the floating habitat unit, the transverse plates of the low profile unit overlap one another. That is, top plate (21) partially overlaps the subjacent inner plate (22), and each of the inner plates partially overlaps the subjacent inner plates and bottom plate (23), thereby resulting in a stairstep arrangement of transverse plates along the sides (202) of the unit.

The low profile unit further includes a second series of transverse plates (28) vertically disposed between adjacent vertical support members (29) along the front (203) and rear (204) sides of the units, and in combination, define inner housing compartments (29d), as well.

Preferably, the horizontal members (25b) of all of the brackets (25) are recessed, thereby resulting in a recessed top end extending from the front to the rear end of the unit. The unit (20) further includes a second series of transverse plates (27a–27c) connected to the top edge of each of the horizontal members (27), wherein the transverse plates include a top plate (27a), a bottom plate (27c), at least one inner plate (27b) disposed therebetween. The transverse plates are oriented along the recessed horizontal members such that the top plate (27a) partially overlaps a subjacent inner plate (27b), and each of the inner plates partially overlaps subjacent inner plates and bottom plate (27c), thereby resulting in a stairstep arrangement of plates therein.

Ecologically, this low profile habitat unit functions in essentially the same manner as described above for the floating habitat unit, but is approximately twice as large, so that it can accommodate fish, crustaceans, and the like as they grow through their juvenile stage of development, and reach a growth stage at which they are more capable of fending for themselves and begin their migration out to yet deeper waters (where natural habitats—coral reefs, ledges or "hard bottom"—or very large artificial reefs are in place). Preferable dimensions of the low profile unit include a bottom end of about 40 to about 45 inches (length)×24 inches (width). The sides of the unit extend upward in a trapezoidal fashion to the top end, which is about 34 to 38 inches (length)×13 to 16 inches (width). For the same reasons discussed above for the floating habitat unit, the distance between transverse plates (i.e. the height of the housing compartments ( )) will vary between about 1.5 inches and 3 inches.

As for floating habitat unit, the height of housing compartments increases from the top end to the bottom end of the unit. We have discovered that there are a variety of larval fish, for example, which do not migrate from spawning grounds to estuarian/bay environments near the water surface, but rather "hug" the bottom as they come in. Thus, the provision of this narrower arrangement of transverse plates at the top of the unit, and thus becoming increasingly larger toward the bottom end of the unit, allows the low profile unit ( ) to accommodate and protect such species, in particular species in the grouper or seabass families, which like to fit snugly into nooks and crannies that are barely larger than themselves.

The low profile unit is preferably used in combination with the floating habitat unit described above, more preferably placed below the floating unit along seawalls and anchored to the bottom of the water floor. Like the floating habitat unit, the low profile unit can also be placed in open bay/estuarian or gulf waters, provided it does not pose a hazard to navigation. Moreover, in order to accept fish migrating from the floating habitat unit, a minimum of three low profile units should be employed in a given restorative area for every one floating habitat unit employed (FIG. 14.)

3. "Sea Tree Habitat Unit:

We have discovered that because of the primarily larger size of fish, crustaceans, and the like living in the low profile unit (20) described above, and their subsequent requirements for a greater number/mass of prey organisms, the bio-fouling assemblage which attaches to the low profile unit and its subsequent ecological production of prey organisms as described for the floating habitat is not by itself sufficient to feed such animals. This is especially important when considering the fact that if prey organisms are not sufficiently close at hand, the desirable fish and other animals living within the habitat will wander too far away from the habitat and can become prey for yet larger predators. Analogous scenarios have been very well documented in aquaculture literature. For example, where after a given period of time, either predation by an accidentally introduced species, or cannibalism by a fast growing cohort of the desirable species has ultimately led to a very few "fat" fish etc. as opposed to a large population with greater overall mass (and thus of greater value).

In an undisturbed ecosystem, such young animals can venture out, primarily at night, and forage for food under the cover of seagrasses, mangroves, and the like, whereas in a "desert like", disturbed ecosystem, there is virtually no cover in which to forage, nor is there much food/prey available for which to forage.

In this regard, the third embodiment of the inventive marine habitat system is provided, as illustrated in FIGS. 6a–6b. The third marine habitat unit, referred herein as the "sea tree" unit (30) is configured to restore the function of seagrasses, etc. in disturbed natural ecosystems as a self-contained, self-stocking, and self-producing "feeding station", acting in the same ecological manner as the floating habitat unit (10) described above.

Specifically, the sea tree unit includes a hollow longitudinal member (31) having an inner chamber (32) and a plurality of platforms (33–35). Each of the platforms is positioned parallel to one another in vertical arrangement about the member (31), which as shown in the figures, is centrally disposed through each of the platforms. The resulting overall configuration of the unit is a substantially conical or "tree-like" unit.

The plurality of platforms of the sea tree unit includes top (33) and bottom (35) platforms with a plurality of inner platforms (34) disposed therebetween. The diameter of the sea tree unit, defined by each platform, increases from the top end (300) to the bottom end (301) of the unit. Moreover, each platform is spaced a distance from subjacent and superjacent platforms to define housing compartments, more specifically a top housing compartment (39a), a bottom housing compartment (39c), and inner housing compartments (39b) therebetween. The distance (D) between platforms (i.e. height of housing compartments) also increases from the top end of the sea tree to the bottom end, and ranges from about 1 inch for the top housing compartment to over 2.5 inches for the lower bottom housing compartment (39c). The intermediate inner housing compartments increase about ⅛ inch in height from the top end to the lower end of the sea tree unit (i.e. the inner compartment subjacent the top compartment is about 1⅛ inches, the next subjacent inner compartment is about 1¼ inches, and so on).

The sea tree unit (30) further includes a unique anchoring assembly (302). Preferably, the anchoring assembly is coaxial with the longitudinal member (31) and positioned below the bottom platform (35). The entire anchoring assembly is about one-half the length of the entire sea tree habitat unit. The anchoring assembly has an inner chamber (32) which is in communication with the inner chamber of the tube. The anchoring assembly further includes a series of locking rings (303) extending from the outer surface of the anchoring assembly and arranged a vertical distance apart from each other. Connecting the locking rings are four vertical ribs (304) disposed between each set of adjacent locking rings. The locking rings thus include a top, bottom, and inner rings disposed therebetween.

The anchoring assembly further includes a plurality of water ports (305) arranged between the locking rings and in communication with the inner chamber of the anchoring assembly. Positioned on the inferior end of the anchoring system and in coaxial communication with the inner chamber is a water nozzle (306). When a pressurized water source (307) is attached to the top portion of the habitat, preferably via some hollow connector assembly (308) as shown if FIG. 6b, and the habitat unit (30) is placed against the sea floor, the water jets liquefy the sand and the anchoring assembly is pushed down until the bottom platform (35) of the sea tree unit reaches firmly to the sea floor. The water is then shut off, and the liquefied sand is allowed to settle back in place around the anchoring assembly of the unit. Once the sand is settled back in place, the locking rings prevent the habitat from being pulled upward, and the vertical ribs between the rings prevent the habitat from twisting or tilting over. Additionally, the bottom platform (35) will quickly become covered with sand suspended by wave or tidal motion, further locking the habitat in place and preventing it from being either pulled out or tilted over by storm events.

Of critical importance, both physically and ecologically, the overall size of the sea tree habitat unit plays a major role in its function. Such a habitat unit, if too large, would not likely withstand storm events due to the resistance to wave or current actions, and if too small, would not fulfill ecosystem/restoration functions. Thus, the preferred length ranges from about 25 to about 28 inches, most preferably about 27¼ inches. Furthermore, the diameter of the top plate is from about 5 to about 6 inches, most preferably about 5.5 inches, and the diameter of the bottom plate is from about 10 to about 12 inches, most preferably 11 inches.

Preferably, the sea tree unit is used in combination with the previously described marine habitat units, and most preferably positioned adjacent the low profile unit ( ) and anchored to the bottom floor of the restorative area along seawalls. Like the floating habitat and low profile units, the sea tree unit may also be placed in open bay/estuarine or gulf waters, provided that they do not pose a hazard to navigation. Moreover, a minimum of five sea trees should be employed for every one low profile unit employed in a give restorative water area (FIG. 14).

3. "Coral head marine habitat system":

A fourth embodiment of the inventive marine habitat system includes a multi-sided unit having from five to eight sides, most preferably six sides resulting in hexagonal habitat unit ( ) as illustrated in FIG. 7. This third marine habitat unit, referred herein as the "coral head" unit (40), essentially serves as a "catch all" in restorative function as described for all of the habitats described above.

Specifically, the coral head unit includes a top end (400), a lower base (401), and about 5 to about 8 sides, most preferably six sides integral with the top end and the base to define an inner region therebetween The unit further includes a first plurality of vertical support members (402) positioned on each side of the unit. Adjacent vertical support member are further separated a distance from one another. The top end (400) of the unit further comprises a frame (403) integral with each of the upper ends the vertical support tag member, and the base (401) of the unit is integral with the lower ends of vertical support members (402).

At least one the sides of the unit further includes a first plurality of transverse planar plates (404) perpendicularly disposed between, and integral with, adjacent vertical; support members and includes a top plate (404a), a bottom plate (404c), and at least one inner plate (404b) disposed therebetween. The transverse plates are further separated a distance vertically from subjacent plates to define top (405a) and inner housing compartments (405b), respectively. The unit further includes a bottom housing compartment (405c) define by the space created between the base (401) and a superjacent inner plate. Each of the housing compartments is in communication with the inner region of the unit so that aquatic animals can move freely throughout the habitat unit (40).

The coral head unit further includes an inner, centrally disposed, component positioned within the inner region and comprise a second plurality of substantially planar support members (410) extending inward toward the center and terminating at a lower platform (411c). Each of the support members (410) is separated a distance from one another to define a second space therebetween. The inner component of the coral head unit further includes a second plurality of transverse plates (411a–411b) disposed between adjacent support members (410) and include top (411a) and subjacent inner plats (411b). These transverse plates are spaced a distance apart from another, vertically, to define top (420a), bottom (420c), and inner (420c) housing compartments.

Preferably, opposing sides of the coral head unit have identical configurations. As shown in FIG. 7, for example, the front three sides of the unit have the following configuration: the left front side comprise three semi-vertical slats (412); the middle front side has ten pairs of transverse plates (404a–404b); and the right front side has a plurality of staggered transverse plates (404a–404b). The corresponding rear three sides opposing the front sides have the same slat and transverse plate arrangement as the front three sides.

The preferred dimensions of the coral head unit are about 17 inches (length)×19 inches (width) at the top end (the base width is about 24 inches). The length of the top frame (403) is preferably 9¾ inches and the length of the base (401) is preferably about the 12 inches, thus the support members (402) are slanted inward slightly, thereby allowing the subjacent/superjacent transverse plates to overlap slightly. The preferred widths of the transverse plates are from about 1⅝ to about 2 inches.

At With the essential conical, tree-like shape of the sea tree unit, and the diameter of the platforms and increasingly larger distance between the platforms from top to bottom, the sea tree unit is designed to encourage the settlement of the bio-fouling assemblage and only relatively small detrivores, especially certain species of crabs and shrimp. At dusk and into the night, these animals have been observed to come out from the interior of the sea tree unit to the outside edges to feed, just as they would in an undisturbed ecosystem, such as seagrasses, mangroves, etc. where they hide during the day, and come out at night to feed. It is at this point where larger desirable fish etc. living the low profile habitats can prey upon them.

The coral head unit will further attract and hold small schools of baitfish such as grunts which are also an important prey item for desirable species living in the low profile habitat unit.

The coral head unit is designed to be anchored to the bottom of the water floor in specific direction with incoming/outgoing tides or currents. The front left side and corresponding opposite rear side, as described above, include a minimum of three semi-vertical slats (412) each. The front middle side is positioned to face directly into the direction of water movement. The purpose for this orientation is the need for fish, etc., which are large enough to start leaving the above described habitat units, to face directly into the direction of water movement, as they begin their migration from the relatively slow moving waters of canal systems (or other disturbed bodies of water) to the mouths/ entrances of such bodies of water where the water moves much faster. Field observations have shown that this orientation is required for their streamlined bodies to keep them in place within the habitat unit with little expenditure of energy. As the tide or current changes, these animals simply reverse direction.

Both the front left side and corresponding opposite rear side, and to a lesser degree the remaining four sides (in the preferred hexagonal embodiment), are designed to allow water to flow through the habitat relatively freely. However, we have found it advantageous for the feeding behavior of fish to place a vertical slat (402a) between the front and back three sides, perpendicular to the current (going either way) at the corner where the "front" and "back" three sides are joined together. These vertical/perpendicular slats slow down the water as it passes by the habitat so that:

(a) fish trailing behind the habitat do not have to fight the current as much, therein conserving energy for growth; and (b) such slats create an eddie/vortex directly behind the habitat unit, which sweeps/sucks in prey organisms for the desirable species.

The transverse plates and vertical slats of the coral head unit have been arranged in somewhat of a random order (i.e., various distances between the slats at various locations on the habitat; both transverse plates and vertical slats), for the purpose of accommodating a healthy variety of bio-fouling organisms.

Preferred placement of the coral head unit in a restorative area is near the mouth/entrance of a man-made canal system where there is swifter moving water than further inside the canal. This habitat design is also well suited for placement in larger man-made made bodies of water, such as the Intercoastal Waterway System of the United States, where there is always swift moving water. In such cases, the coral head unit would be used with one or more of the previous described bottom anchored habitat units (i.e. low profile unit (20) and sea tree unit (30)). Finally, the coral head unit (40) can also be placed in any open bay/esturarian or gulf waters, provided it does not pose a hazard to navigation.

Preferably, the coral head unit is used in combination with the foregoing inventive habitat units. A minimum of five coral head units should be employed for every one low profile unit employed. Furthermore, ten additional sea tree units (30) should be employed for every one coral head unit employed in addition to the five sea tree units used for every one low profile unit (20). Thus, for every one floating habitat unit (10) employed in restorative area, a minimum of three low profile units (20), 15 coral head units (40) and 55 sea tree (30) units should be employed (FIG. 14).

4. Oyster Dome:

FIGS. 8–10 illustrate an oyster dome (50) designed to restore oyster beds/bars which have been destroyed due to silting over in relatively flat, horizontally oriented sea bottom types. Such silt also prevents the settlement of oyster post-larvae (i.e. spat), as they require a "clean" substrate upon which to settle, undergo metamorphose into the true oyster form, and thereafter go on to complete their life cycle.

This silt, which comes both from upland runoff and from the death of seagrasses which had trapped enormous amounts of silt prior to death (and subsequently releasing the silt upon death), has been considered by many scientists as an environmental problem equal to, if not greater than, the problem of massive algae blooms caused by human activities.

As illustrated, the oyster dome (50) comprises a top end (500) and a lower substantially circular platform (501) having a top surface (502) and an outer edge (503). The dome further includes a plurality of vertically spaced ribs (51) integral with the top surface platform and positioned in close proximity to the outer edge of the platform. Each of the ribs further extends upward and curving toward the center (53 of the top end. The dome also includes a plurality of vertically spaced slats (52) positioned parallel to one another between adjacent ribs (51).

All of the slats (52) on the oyster dome are vertical in orientation about the ribs (51), so as to prevent, or "slough off", any settlement of silt, thus encouraging the settlement of oyster spat. Significantly, the bottom platform (501) will help prevent the dome from eventually sinking into the bottom of the water system, whereas without the platform, the vertical slats (51 would cut into the bottom of the waterway almost immediately.

The oyster dome (50) is designed in a "spider web" fashion, with slats (52) at the top end of the unit being the closest together, and the ones at the bottom being the furthest apart. The purpose for having the slats closest together at the top is to encourage the initial settlement of oyster spat, as they appear to prefer snug places, protected from predators, as they pass through their early life stages. For reasons yet unknown, perhaps related to chemical signals, once the initial settlement of oysters has occurred, continued oyster settlement occurs rapidly.

The slats (52) from the bottom of the habitat dome to approximately ⅓rd upward along the dome are set sufficiently far apart that when oysters mature, there will sufficient room in the structure for the trapping of silt, therein taking such silt out of commission. Furthermore, we have discovered that oysters living on such vertical surfaces generally grow in a vertical fashion, with their feeding aperture (i.e. "mouth") pointing upward in a vertical fashion. This unique feature allows for the further entrapment of silt beneath the "dead zone" under the habitat dome.

The oyster community is also integrated with the filter-feeding portion of the bio-fouling community, and as such, filters considerable amounts of excessive algae from the water body. In turn, the clearer water produced aids in the restoration of the natural environment in which it occurs as described for the floating habitat.

The fecal/detritus produced in natural oyster beds supports both a large number per unit area and variety of detritovores, primarily many species of mud crabs, pistol shrimp, and marine worms. The great abundance of such animals which will live in and about the oyster dome will act, as further "feeding stations" for fish, etc. living and growing in the above described habitats.

It is very well documented in the literature that oysters consume large amounts of both bacteria and viruses, which if not lethal, can cause great sickness in humans. It is generally agreed upon in the scientific community that at least one reason for this could be contributed to oyster bed die-offs, again, a causative factor being silt. Pure logic dictates that the fewer the number of oysters present per unit area, combined with the same number of bacteria and viruses, for example, per same unit area, the higher the concentration of such bacteria, etc. will be per oyster.

Similarly, if the number of oysters per unit area with the same number of bacteria, etc. per unit area were to increase (or, as environmental laws stiffen and the number of bacteria, etc. are reduced), then the actual number of bacteria, etc. consumed per oyster would be "spread out," lessening their numbers per oyster, in theory, to safe levels, provided that sufficient habitat as herein described is made available to restore oyster populations.

The preferred dimensions of the oyster dome are 3 feet (diameter of bottom platform (50)) and 18 inches (height). The height (H2) of each slat (52) is about 3 inches vertically. The center (53) of the top end of the dome is configured to receive a female portion of a anchoring/anti-chafe device described in more detail below.

The preferred placement of the oyster dome (50) is on top of or adjacent to oyster beds which have been silted over and are dead. A secondary preferred placement is in man-made canal systems adjacent to the previously described habitat unit (FIG. 14). The dome can also be placed in open, deeper bay waters for the sole purpose of trapping silt, thus taking the silt "out of commission."

The number of oyster domes that should be employed for a given restorative area is dictated in the field at various locations depending upon the area of oyster beds which have been destroyed.

B. Microsubstrate

It is preferred that the inventive habitat units described herein include a plurality of substrates positioned on one or more, most preferably all, of the transverse plates or platforms of the floating habitat unit, the low profile unit, the coral head unit, and the sea tree unit, respectfully. It is noted that for ease of illustration, all of the figures directed to the inventive habitat units do not show the substrates; however, FIGS. 11a–11b illustrates a preferred design of one type of substrate (60). The purpose of the substrate on the surfaces of the habitat units is to provide a means for helping the animals attach to the habitat unit better during adverse weather conditions (i.e. storms).

As discussed in more detail below, it is preferred that the substrate be simultaneously formed onto the desired slats (S) or transverse plates of the habitat structures as each habitat unit is manufactured as a single piece (versus assembly of separate components). While substrates employing different configurations may be used, FIGS. 11a–11b illustrates a preferred design comprising a series of semi-circular, U-shaped member having an open top (61) and defining an inner channel (62), with each substrate (60) completing about 70% or more of a circle to maintain sea animals within the substrate. Preferably, the lower outer surface of each substrate is provided with additional support material (64) for increased strength. Each substrate is preferably at least ⅛–¼ inch in thickness.

C. Manufacture of Marine Habitat Systems

Regardless of how carefully man-made habitats and joining parts are assembled, the hydraulic power of even small waves in a canal system will loosen the joints where the habitat units have been assembled. Fine silt can enter such joints and act as a chafing abrasive which, over time, causes the habitat unit to fall apart, therein becoming a pollutant in and of itself, thus littering the sea floor and causing damage to natural marine habitats. Inappropriately designed artificial reefs placed offshore, for example, have caused enormous damage to coral reefs when they do break apart. Such artificial reef configurations are now illegal in Florida, for example.

To avoid this serious problem, all of the inventive habitat units should be constructed of one-piece, injection molded plastic, with no moving parts, and thus no chafe points. However, at specific points where such one-piece habitats can either be arranged in multiple layers (floating unit described below), or anchored to the bottom an a anti-chafe system, discussed further below, may be molded into the habitats at strategic points.

Material that may be used to manufacture the inventive habitat units include, but are not limited to, HDPE and high density foam. The most preferred material is HDPE with 20% recycled HDPE plastic in high density foam.

D. Antichafe/Anchoring Device

The present invention also comprises a novel antichafe anchoring device for attachment to the inventive habitat systems, as illustrated, or example, in FIGS. 12a–12b. This device was developed out of two needs: (1) to assemble/attach floating habitats together; and (2) to anchor other members of the inventive habitat family to the bottom of the waterway. As described elsewhere herein, there is a critical need in the art to eliminate moving parts, and thus chafing and the eventual breakdown of the habitat. At the same time, however, there must be sufficient flexibility and movement of the habitat units to absorb wave energy without causing stress fractures within the habitat unit itself.

As illustrated in the figures, the inventive anti-chafe device comprises a platform (70) or "female portion" secured to the habitat unit and including an aperture (not shown). The device further includes a frustoconical receptacle (71) integral with and extending from the platform, with the receptacle having an inner chamber (72) in communication with the aperture. As shown in FIG. 1 for the floating habitat unit, the receptacle is oriented upward for attachment to a floating device or a second superjacent floating unit. For the "bottom anchor" habitat units (i.e. the sea tree unit, the coral head unit, and the low profile unit), the receptacle is oriented downward toward the floor of the waterway (see FIG. 5a–5b).

The antichafe device further includes a "male portion" or sleeve (73) for attachment to a rope (R) and configured for engagement within the receptacle. Specifically, the sleeve is formed of two longitudinal symmetrical portions (73a) movably attached to one another along a longitudinal seam (74), thereby permitting the sleeve to move into an open position (see FIG. 12a) and a closed position (see FIG. 12b). The inner diameter of the inner chamber is sufficiently large to carry a rope therein, most preferably about 10 percent smaller than the diameter of the rope.

The sleeve (73), when in a closed position, also has an outer configuration defined by an upper frustoconical portion (75a) designed for complementary engagement within the inner chamber (72) of the receptacle (71). The upper frustoconical portion further includes the superior end (1) of the sleeve and a base portion contiguous with a base portion of a lower frustoconical portion (75b) of the sleeve to define a central section (76) therein. Preferably, the outer diameter of the sleeve is widest at the central section and tapers toward the superior (1) and inferior (2) ends.

When the rope (R) is engaged within the sleeve and exits each end thereof as shown in FIG. 12b, the rope essentially becomes one piece with the device. However, the flexible rope extending outward from each point is free to move, giving the habitat units the above described movement necessary to maintain their structural integrity.

E. Anchoring Assembly

The present invention also comprises an anchor assembly which is secured at one end to the habitat units via the anti-chafe device describe above and further below. Referring now to FIGS. 13a–13b, the anchoring assembly (80) comprises a cylindrical anchor head (81) having an open top (82) and bottom (83) end and an inner compartment (84) in communication therewith. The anchor head is preferably a single piece of machine molded, high strength plastic (e.g. glass reinforced plastic or forged steel) which is streamlined or tapered at the bottom for the purpose of injecting it below the seafloor with the aid of a water jet, for example, as described below.

The anchoring assembly further includes a pair of anchoring flukes (85) positioned on opposed outer sides of anchor head, wherein each of the flukes has an inferior end movably secured to the outer side of the anchor head by a hinge comprising a pin (86) passing through the flukes and anchor head as illustrated. Each fluke further includes a novel reinforcing rib (87) running down the middle of the inner surface of the fluke. The anchor head further includes a corresponding slot (88) for receiving the rib (87) when the fluke is folded together with the anchor head prior to water jet injection below the sea floor.

The anchoring assembly further includes a pin (89) positioned near the top end of the anchor head and extends within the inner compartment as a means for securing the anchor rope (R).

The top of the anchor head is designed so that a water jetting pipe assembly can be fitted snugly onto the top of the anchor head; the anchor rope is placed through the center of the water jetting pipe, exiting at the top of the pipe through a slot where it is firmly affixed, adjacent to where the water jetting source (91) will be attached. Once assembled, the anchor head is lowered to the sea floor, the water source (91) is forced through the injection pipe (92), through the anchor head, and exits out of the small nozzle (92) at the tip of the anchor head. Through this process the sea floor sand is liquified, thus allowing the anchor head to easily penetrate to the desirable depth below the sea floor. The water source is then turned off, and the injection pipe quickly pulled out of the sea floor, leaving only the anchor rope extending from the sea floor.

As the hole created in the sea floor quickly fills back in with sand, the anchor head is locked in place by pulling upward on the anchor rope, which causes the angled tips (93) of the flukes to dig into the sand and open up. A weight scale (not shown) is then attached to the anchor rope and mechanically pulled upward until the desired holding power of the anchor head is reached.

Once the anchor head is set, a habitat unit is placed in the water and the anchor rope is passed through the female portion or receptacle (71) of the anchor/anti-chafe device, which, as described above, is most preferably molded into the habitat unit. The separate male portion or sleeve (73) of the anchor/anti-chafe device is then loosely clipped to the anchor line or rope (R), and tapped snugly into the receptacle (71) of the antichafe device of the habitat unit, while the anchor rope is being tightly held. The outside diameter of the sleeve (73) is approximately 10% larger than the inside dimension of the receptacle, and the inside dimension of the sleeve (73), as discussed in the preceding section, is approximately 10% smaller that the size of the rope it will clamp onto. Therefore, as the sleeve is tapped into the receptacle, the receptacle forces the sleeve to lock down onto the anchor rope, while at the same time, the sleeve locks down into the receptacle. The overall effect is that the harder one pulls upward upon the habitat unit, the harder down the anchor/anti-chafe device locks in. Preferably molded into the platform and integral with the receptacle of all the anti-chafe parts on all of the habitats is structural ribbing 72 which aids in holding capacity of the entire habitat unit.

The foregoing disclosure and description of the invention are illustrative and explanatory thereof, and various changes in the size, shape, and materials, as well as in the details of the illustrated construction, may be made without departing from the spirit of the invention.

What is claimed is:

1. A marine habitat system suitable for aiding in the restoration of aquatic ecosystems, said system comprising a unit having a top end, a bottom end, and two sides, wherein said unit further includes:

a plurality of vertical plates positioned parallel to one another, said plurality including adjacent vertical plates separated a distance from one another to define first open spaces therebetween, said plurality of vertical plates further including a front plate and a rear plate, each of said front and rear plates having outer walls which define a front end and a rear end of the unit, respectively; and a plurality of transverse plates disposed within said first open spaces, wherein said plurality of transverse plates are perpendicular to said adjacent vertical plates, said plurality of transverse plates including a first series of transverse plates arranged vertically between said adjacent vertical plates along each of said two sides, said first series of transverse plates including a top plate, a bottom plate, and at least one inner plate disposed between said top and bottom plates;

wherein said top plate and said at least one inner plate of said first series are spaced a distance apart vertically from one another to define top and inner housing compartments, respectively; and wherein said bottom plate is spaced a distance apart vertically from a superjacent inner plate of said first series to define a bottom housing compartment, each of said housing compartments having a height; and whereby the height of each of said housing compartments is sufficient to shelter a variety of aquatic animals throughout the growth and development of said animals.

2. The marine habitat system of claim 1, wherein said height of each of said housing compartments is increasingly larger from the top end to the bottom end of the unit.

3. The marine habitat system of claim 2, wherein said top plate and inner plates of said first series of transverse plates partially overlap subjacent inner plates, thereby resulting in a stair step arrangement of said first series of transverse plates along said sides of said unit.

4. The marine habitat system of claim 1, said front and rear vertical plates further including a second series of transverse plates vertically arranged along the outer walls of said front and rear vertical plates.

5. The marine habitat system of claim 4, wherein said second series of transverse plates includes a top plate, a bottom plate, and at least one inner plate disposed therebetween, wherein said top, bottom, and at least one inner plate of said second series each have widths that are increasingly larger from said top end to said bottom end of the unit, such that the top plate and said at least one inner plate of said second series partially overlap subjacent inner plates of said second series, thereby resulting in a stair step arrangement of said second series of transverse plates along the outer walls of said front and rear vertical plates of the unit.

6. The marine habitat system of claim 1, further including a series of reinforcement members disposed between said adjacent vertical plates.

7. A marine habitat system suitable for aiding in the restoration of aquatic ecosystems, said system comprising:

(a) a unit having a top end, a bottom end, and two sides; said unit further including a plurality of vertical plates positioned parallel to one another, said plurality including adjacent vertical plates separated a distance from one another to define first open spaces therebetween, said plurality of vertical plates further including a front plate and a rear plate, each of said front and rear plates having outer walls which define a front end and a rear end of the unit, respectively; and a plurality of transverse plates disposed within said first open spaces, wherein said plurality of transverse plates are perpendicular to said adjacent vertical plates, said plurality of transverse plates including a first series of transverse plates arranged vertically between said adjacent vertical plates along each of said two sides, said first series including a top plate, a bottom plate, and at least one inner plate disposed between said top and bottom plates;

wherein said top plate and said at least one inner plate of said first series are spaced a distance apart vertically from one another to define top and inner housing compartments, respectively; and wherein said bottom plate is spaced a distance apart vertically from a superjacent inner plate of said second series to define a bottom housing compartment, each of said housing compartments having a height; and whereby the height of each of said housing compartments is sufficient to shelter a variety of aquatic animals throughout the growth and development of said animals; and (b) at least one floatation device secured to said unit, thereby allowing said unit to float in water.

8. The marine habitat system of claim 7, wherein said height of each of said housing compartments is increasingly larger from the top end to the bottom end of the unit.

9. The marine habitat system of claim 8, wherein said top plate and inner plates of said first series of transverse plates partially overlap subjacent inner plates, thereby resulting in a stair step arrangement of said first series of transverse plates along said sides of said unit.

10. The marine habitat system of claim 7, said front and rear vertical plates further including a second series of transverse plates vertically arranged along the outer walls of said front and rear vertical plates.

11. The marine habitat system of claim 10, wherein said second series of transverse plates includes a top plate, a bottom plate, and said at least one inner plate disposed therebetween, wherein said top, bottom, and at least one inner plate of said second series each have widths that are increasingly larger from said top end to said bottom end of the unit; such that the top plate and said at least one inner plate of said second series partially overlap subjacent inner plates of said second series, thereby resulting in a stair step arrangement of said second series of transverse plates along the outer walls of said front and rear vertical plates of the unit.

12. The marine habitat system of claim 7, further including a series of reinforcement members disposed between said adjacent vertical plates.

13. The marine habitat system of claim 7, wherein said at least one floatation device is a buoy.

14. A marine habitat system suitable for aiding in the restoration of aquatic ecosystems, said system comprising a unit having a top end, a bottom end, and two sides, wherein said unit further includes:

(a) a plurality of vertical plates positioned parallel to one another, said plurality including adjacent vertical plates separated a distance from one another to define first open spaces therebetween, said plurality of vertical plates further including a front plate and a rear plate, each of said front and rear plates having outer walls which define a front end and a rear end of the unit, respectively;

(b) a plurality of transverse plates disposed within said first open spaces, wherein said plurality of transverse plates are perpendicular to said adjacent vertical plates, said plurality of transverse plates including a first series of transverse plates arranged vertically between said adjacent vertical plates along each of said two sides, said first series of transverse plates including a top plate, a bottom plate, and at least one inner plate disposed between said top and bottom plates;

wherein said top plate and said inner plates of said first series are spaced a distance apart vertically from one another to define top and inner housing compartments, respectively; and wherein said bottom plate is spaced a distance apart vertically from a superjacent one of said inner plates of said first series to define a bottom housing compartment, each of said housing compartments having a height; and (c) said front and rear vertical plates including a second series of transverse plates arranged vertically along the outer walls of said front and vertical plates, wherein said second series further includes a top plate, a bottom plate, and at least one inner plate disposed therebetween, wherein said top, bottom, and at least one inner plate of said second series each have widths that are increasingly larger from said top end to said bottom end of the unit; such that the top plate and said at least one inner plate of said second series partially overlap subjacent inner plates of said second series, thereby resulting in a stair step arrangement of said second series of transverse plates along the outer walls of said front and rear vertical plates of the unit; and whereby the height of each of said housing compartments is sufficient to shelter a variety of aquatic animals throughout the growth and development of said animals.

15. The marine habitat system of claim 14, further including a series of reinforcement members disposed between said adjacent vertical plates.

16. The marine habitat system of 15, further including at least one floatation device secured to said unit, thereby allowing said unit to float in water.

17. The marine habitat system of 14, further including at least one floatation device secured to said unit, thereby allowing said unit to float in water.

* * * * *

UNITED STATES PATENT AND TRADEMARK OFFICE
CERTIFICATE OF CORRECTION

PATENT NO. : 6,089,191
DATED : July 18, 2000
INVENTOR(S) : Michael Calinski and Bradley Gale It is certified that error appears in the above-identified patent and that said Letters Patent is hereby corrected as shown below:

Column 4,
Line 27, delete "CSS"

Figure 1A:
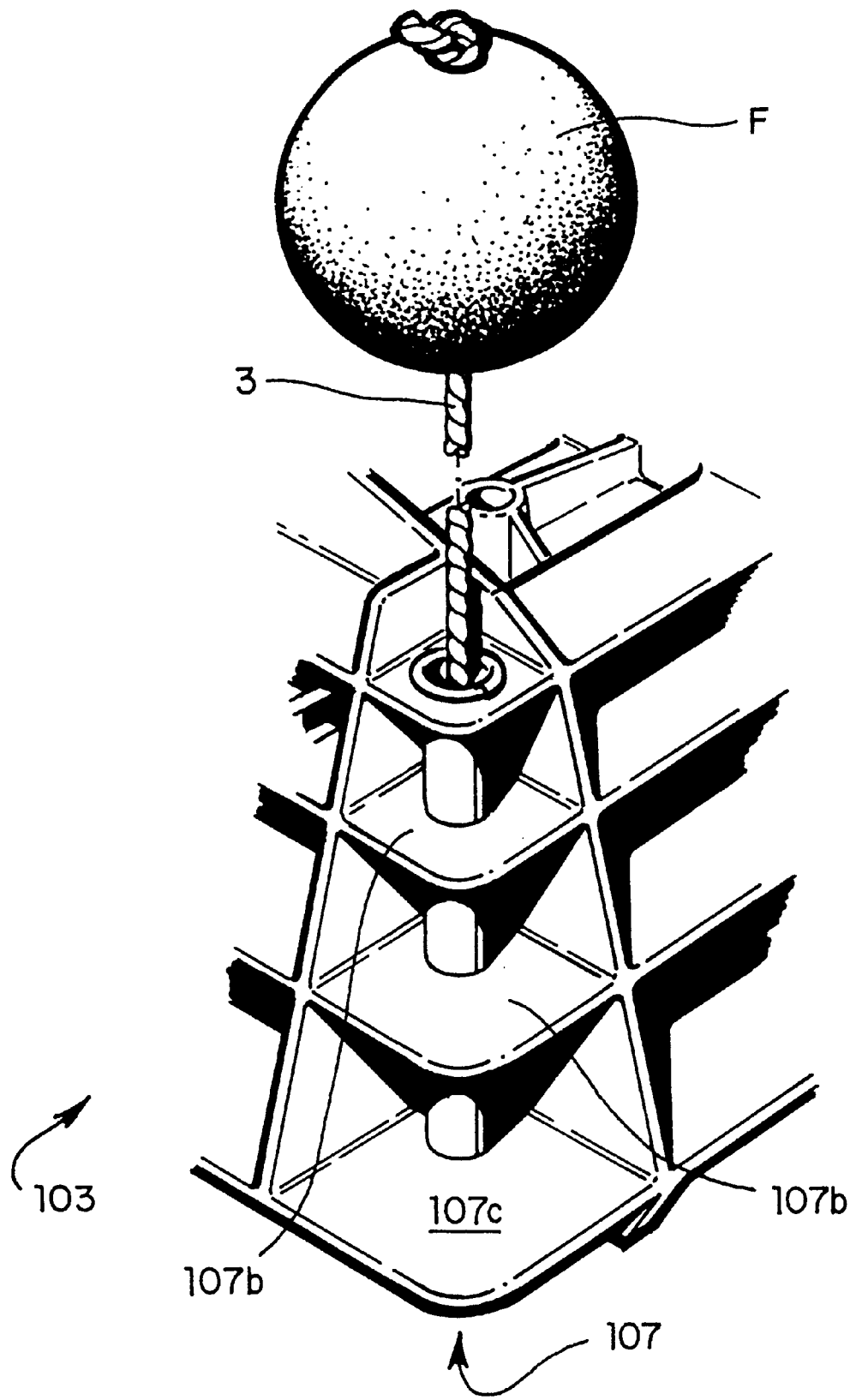

Column 5,
Lines 54-55, delete "(not shown)" and insert -- (F) --.
Line 56, after "1" insert -- 1a --
Line 65, after "devices" insert -- (F) -- and after "systems" insert -- (Fig. 1a). The floation devices (f) may also be secured through the anti-chafe/anchoring device described further below in Section D and illustrated in Figs. 12, 12a, and 12b. --
Line 66, after "rope" insert -- (3) --

Column 6,
Line 4, delete "( )" and insert -- (10) --

Column 8,
Line 54, delete "horizontal" and insert -- vertical -- and delete "(27)" and insert -- (25) --

Column 9,
Line 11, delete "( ))" and insert -- (H1) --
Line 22, delete "( )" and insert -- (20) --

Column 11,
Line 23, delete "( )" and insert -- (40) --
Line 29, delete "(404)" and insert -- (404a - 404c) --
Line 62, delete "plats" and insert -- plates --

Column 15,
Line 20, after "thickness" insert -- (t) --

Column 16,
Line 58, and in column 17, line 20, delete "(R)" and insert -- (R1) --
Lines 61,65,and 67, after "head" insert -- (81) --

Column 17,
Lines 1, 8, and 14, after "head" insert -- (81) --
Lines 5,9,11,15,26, and 29, after "rope" insert -- (R1) --

Column 16,
Line 64, after "attached" insert -- , as shown in Fig. 13b --
Line 62, after "pipe" insert -- (90) --
Line 66, delete "(92)" and insert -- (90) --

UNITED STATES PATENT AND TRADEMARK OFFICE
CERTIFICATE OF CORRECTION

PATENT NO. : 6,089,191
DATED : July 18, 2000
INVENTOR(S) : Michael Calinski and Bradley Gale It is certified that error appears in the above-identified patent and that said Letters Patent is hereby corrected as shown below:

Column 17,
Line 27, after "sleeve" insert -- (73) --
Line 28, after the first "receptacle" insert -- (71) --
Line 29, after "sleeve" insert -- (73) --
Line 33, after "platform" insert -- (70) --
Line 35, delete "72" and insert -- (71a) --

Signed and Sealed this

Twenty-fifth Day of December, 2001

Attest:

Attesting Officer

JAMES E. ROGAN
Director of the United States Patent and Trademark Office